United States Patent
Shim et al.

(10) Patent No.: US 10,706,251 B2
(45) Date of Patent: Jul. 7, 2020

(54) MOBILE TERMINAL

(71) Applicant: LG ELECTRONICS INC., Seoul (KR)

(72) Inventors: Hongjo Shim, Seoul (KR); Hyunwoo Kim, Seoul (KR); Sungho Woo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/290,213

(22) Filed: Mar. 1, 2019

(65) Prior Publication Data

US 2019/0197285 A1  Jun. 27, 2019

Related U.S. Application Data

(63) Continuation of application No. 15/949,646, filed on Apr. 10, 2018.

(30) Foreign Application Priority Data

Jun. 20, 2017  (KR) .................. 10-2017-0078024

(51) Int. Cl.
*G06K 9/00* (2006.01)
*G06F 3/041* (2006.01)
(Continued)

(52) U.S. Cl.
CPC ........... *G06K 9/0002* (2013.01); *G06F 3/016* (2013.01); *G06F 3/0414* (2013.01); *G06F 3/0421* (2013.01); *G06K 9/0004* (2013.01); *G06K 9/00013* (2013.01); *G06K 9/00087* (2013.01); *G06K 9/00912* (2013.01); *G06F 2203/04105* (2013.01); *G09G 3/3225* (2013.01); *G09G 2380/02* (2013.01)

(58) Field of Classification Search
CPC ............... G06K 9/0004; G06K 9/0002; G06K 9/00114; G06K 9/00912; G06K 9/00006; G06F 21/32; G06F 3/0421; G06F 3/0414; G06F 2203/04105; G09G 3/3225
See application file for complete search history.

(56) References Cited

U.S. PATENT DOCUMENTS 9,030,411 B2    5/2015  Itkowitz et al.
2008/0059131 A1  3/2008  Tokita et al.
(Continued)

FOREIGN PATENT DOCUMENTS

KR  10-2018-0014914 A  2/2018

*Primary Examiner* — Jingge Wu
(74) *Attorney, Agent, or Firm* — Birch, Stewart, Kolasch & Birch, LLP

(57) ABSTRACT

A mobile terminal includes a display unit configured to display an image and comprising an OLED pixel module emitting light and a light non-transmitting layer formed therebelow; a fingerprint recognition sensor configured to recognize a fingerprint by receiving, when the light emitted from the OLED pixel module is reflected by a finger, the reflected light; a sensor insertion space formed by perforating a part of the light non-transmitting layer, the fingerprint recognition sensor being inserted into the sensor insertion space; and a force sensor disposed at a side surface of the fingerprint recognition sensor and configured to measure a magnitude of pressure applied to the force sensor.

22 Claims, 33 Drawing Sheets

(51) Int. Cl.
*G06F 3/042* (2006.01)
*G06F 3/01* (2006.01)
*G09G 3/3225* (2016.01)

(56) References Cited

U.S. PATENT DOCUMENTS

| | | | |
|---|---|---|---|
| 2010/0027854 A1 | 2/2010 | Chatterjee et al. | |
| 2010/0045612 A1 | 2/2010 | Mölne | |
| 2010/0311489 A1* | 12/2010 | Miller | A63F 1/12 |
| | | | 463/16 |
| 2011/0057899 A1* | 3/2011 | Sleeman | G01L 1/146 |
| | | | 345/174 |
| 2012/0028577 A1 | 2/2012 | Rodriguez et al. | |
| 2012/0242592 A1* | 9/2012 | Rothkopf | G06F 1/1652 |
| | | | 345/173 |
| 2012/0262408 A1* | 10/2012 | Pasquero | G06F 3/0412 |
| | | | 345/174 |
| 2013/0100008 A1 | 4/2013 | Marti et al. | |
| 2013/0135244 A1* | 5/2013 | Lynch | G06F 3/0414 |
| | | | 345/174 |
| 2014/0002113 A1 | 1/2014 | Schediwy et al. | |
| 2014/0198130 A1 | 7/2014 | Lacroix | |
| 2014/0354570 A1 | 12/2014 | Makinen et al. | |
| 2015/0277562 A1 | 10/2015 | Bard et al. | |
| 2015/0331508 A1 | 11/2015 | Nho et al. | |
| 2017/0017824 A1 | 1/2017 | Smith et al. | |
| 2017/0103246 A1 | 4/2017 | Pi et al. | |
| 2017/0220838 A1* | 8/2017 | He | G06K 9/0004 |
| 2017/0255255 A1 | 9/2017 | Levesque et al. | |
| 2017/0270342 A1* | 9/2017 | He | G06F 3/0412 |
| 2017/0308228 A1* | 10/2017 | Benkley, III | G06K 9/00013 |
| 2017/0329953 A1 | 11/2017 | Defazio et al. | |
| 2018/0005005 A1* | 1/2018 | He | G06F 3/0412 |
| 2018/0059839 A1* | 3/2018 | Kim | H01L 51/5284 |
| 2018/0081479 A1* | 3/2018 | Kravets | G06F 3/016 |
| 2018/0097199 A1 | 4/2018 | Jo et al. | |
| 2018/0129798 A1* | 5/2018 | He | G06K 9/00013 |
| 2018/0180450 A1 | 6/2018 | Liu | |
| 2018/0196569 A1* | 7/2018 | Jun | G06F 3/044 |
| 2018/0196985 A1* | 7/2018 | Ling | G06K 9/0004 |
| 2018/0217669 A1 | 8/2018 | Ligtenberg et al. | |
| 2018/0218195 A1* | 8/2018 | Sheik-Nainar | G06K 9/00013 |
| 2018/0260050 A1 | 9/2018 | Unseld et al. | |
| 2018/0284892 A1 | 10/2018 | Kwon et al. | |
| 2018/0284936 A1* | 10/2018 | Vummidi Murali | G04G 21/00 |
| 2018/0348936 A1* | 12/2018 | He | G06K 9/0004 |
| 2018/0365466 A1* | 12/2018 | Shim | G06F 3/0421 |
| 2018/0373917 A1 | 12/2018 | Sheik-Nainar et al. | |
| 2019/0012512 A1* | 1/2019 | He | G06K 9/00087 |
| 2019/0034020 A1* | 1/2019 | He | G02F 1/13338 |
| 2019/0180074 A1* | 6/2019 | Ding | G06K 9/0004 |
| 2019/0197285 A1 | 6/2019 | Shim et al. | |
| 2019/0278412 A1 | 9/2019 | Byeon et al. | |

\* cited by examiner

Total : 355um (a)    (b)

MOBILE TERMINAL

CROSS-REFERENCE TO RELATED APPLICATIONS

This Application is a Continuation of co-pending U.S. patent application Ser. No. 15/949,646 filed on Apr. 10, 2018, which claims the priority benefit under 35 U.S.C. § 119(a) to Korean Patent Application No. 10-2017-0078024 filed in the Republic of Korea on Jun. 20, 2017, all of which are hereby expressly incorporated by reference into the present application.

BACKGROUND OF THE INVENTION

Field of the Invention

The present invention relates to a mobile terminal, and more particularly, to a mobile terminal in which a fingerprint recognition sensor and a force sensor are implemented as an under display type.

Discussion of the Related Art

Terminals may be divided into mobile/portable terminals and stationary terminals according to whether or not the terminals are movable. Further, mobile terminals may be divided into handheld terminals and vehicle mounted terminals according to whether or not users may directly carry the mobile terminals.

Functions of mobile terminals are gradually diversified. For example, mobile terminals have a data and voice communication function, a photographing and video function using a camera, a voice recording function, a music file reproducing function through a speaker system and a function of outputting an image or video to a display unit. Some mobile terminals perform an electronic gaming function or a multimedia function. Recently, mobile terminals may receive a multicast signal providing visual content, such as a broadcast, a video or a television program.

As functions of terminals are diversified, the terminals are implemented as multimedia players having multiple functions, for example, photographing or video recording, reproduction of a music or video file, gaming, reception of a broadcast, etc.

In order to support and increase these functions of terminals, improvement of structural elements and/or software elements of terminals may be considered.

Recently, research on reduction of a bezel and enlargement of a display unit on a front surface of a terminal has been vigorously conducted. This is to allow a user to more widely view an image through the display unit without increase in the size of the terminal. In general, a home button as a mechanical button (mechanical key) or a touch-type button (touch key) is provided at a bezel of a terminal. Further, technology, in which a home button includes a fingerprint recognition sensor and a user's fingerprint is recognized through the home button, has been proposed. However, the home button is provided at the bezel and thus reduction of the bezel through general methods is limited.

Therefore, recently, a home button is not separately provided at a bezel of a terminal but is formed at a designated position of a display unit as a touch key. Further, a force sensor and a haptic module are further provided at the position of the home button and thus provide an operating feeling similar to actual operation of a mechanical button. Further, technology in which such a force sensor is disposed under a display unit, i.e., is implemented as an under display type, is proposed. However, only the force sensor is actually implemented as an under display type. Therefore, in order to recognize a fingerprint, a fingerprint recognition sensor must be disposed at a different position, i.e., on the rear surface of the mobile terminal.

SUMMARY OF THE INVENTION

Accordingly, the present invention is directed to a mobile terminal that substantially obviates one or more problems due to limitations and disadvantages of the related art.

An object of the present invention is to provide a mobile terminal in which a force sensor and a fingerprint recognition sensor are implemented as an under display type.

Another object of the present invention is to provide a mobile terminal in which a force sensor and a fingerprint recognition sensor are disposed at positions close to each other without increase in the thickness of the mobile terminal and thus fingerprint recognition and provision of haptic feedback are simultaneously provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a display unit configured to display an image and including an OLED pixel module emitting light and a light non-transmitting layer formed therebelow, a fingerprint recognition sensor configured to recognize a user fingerprint by receiving, when the light emitted from the OLED pixel module is reflected by a user finger, the reflected light, a sensor insertion space formed by perforating a part of the light non-transmitting layer, the fingerprint recognition sensor being inserted into the sensor insertion space, and a force sensor disposed to surround a side surface of the fingerprint recognition sensor and to provide haptic feedback when pressure is applied to the force sensor.

The force sensor may have a polygonal ring shape and measure magnitudes of pressure applied to respective edges thereof.

If a difference between the magnitudes of the pressure applied to the respective edges of the force sensor exceeds a predetermined error range, the display unit may display an indicator representing correction of an application direction of the pressure.

The light non-transmitting layer may include at least one of rubber, urethane, copper or graphite.

The force sensor may include a plurality of electrodes and a dielectric material, and measure magnitudes of the applied pressure through change in capacitance.

The force sensor may include a first PET film provided with a force-sensitive resistive (FSR) applied thereto and a second PET film provided with a silver ink pattern formed thereon, and measure magnitudes of the applied pressure through change in resistance of the silver ink pattern of the second PET film.

The force sensor may include a cushion member to absorb impact.

The cushion member may be disposed on one of upper and lower surfaces of the force sensor.

The force sensor may include a coil configured to surround the side surface of the fingerprint recognition sensor in a spiral shape and a conductor disposed below the coil, and measure magnitudes of the applied pressure through an intensity of eddy current generated in the conductor according to change in a magnetic field formed around the coil.

The coil may be formed on the light non-transmitting layer by patterning.

The conductor may be a part of a case disposed below the display unit and receiving the display unit, the fingerprint recognition sensor and the force sensor.

The force sensor may include a film having a shape transformable by the applied pressure and strain gauges attached to each of upper and lower surfaces of the film, and measure magnitudes of the applied pressure through change in resistance of the strain gauges.

The fingerprint recognition sensor may be disposed below the OLED pixel module.

In another aspect of the present invention, a mobile terminal includes a display unit configured to display an image and including an OLED pixel module emitting light and a light non-transmitting layer formed therebelow, a fingerprint recognition sensor configured to recognize a user fingerprint by receiving, when the light emitted from the OLED pixel module is reflected by a user finger, the reflected light, a sensor insertion space formed by perforating a part of the light non-transmitting layer, the fingerprint recognition sensor being inserted into the sensor insertion space, and a force sensor formed on a lower surface of the fingerprint recognition sensor and outputting haptic feedback when pressure is applied to the force sensor.

The force sensor may have a polygonal ring shape and measure magnitudes of pressure applied to respective edges thereof.

If a difference between the magnitudes of the pressure applied to the respective edges of the force sensor exceeds a predetermined error range, the display unit may display an indicator representing correction of an application direction of the pressure.

The mobile terminal may further include a stiffening member configured to surround a circumference of the force sensor.

The light non-transmitting layer may include at least one of rubber, urethane, copper or graphite.

The force sensor may include strain gauges attached to a lower surface of the fingerprint recognition sensor, and measure magnitudes of the applied pressure through change in resistance of the strain gauges.

The fingerprint recognition sensor may be disposed below the OLED pixel module.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
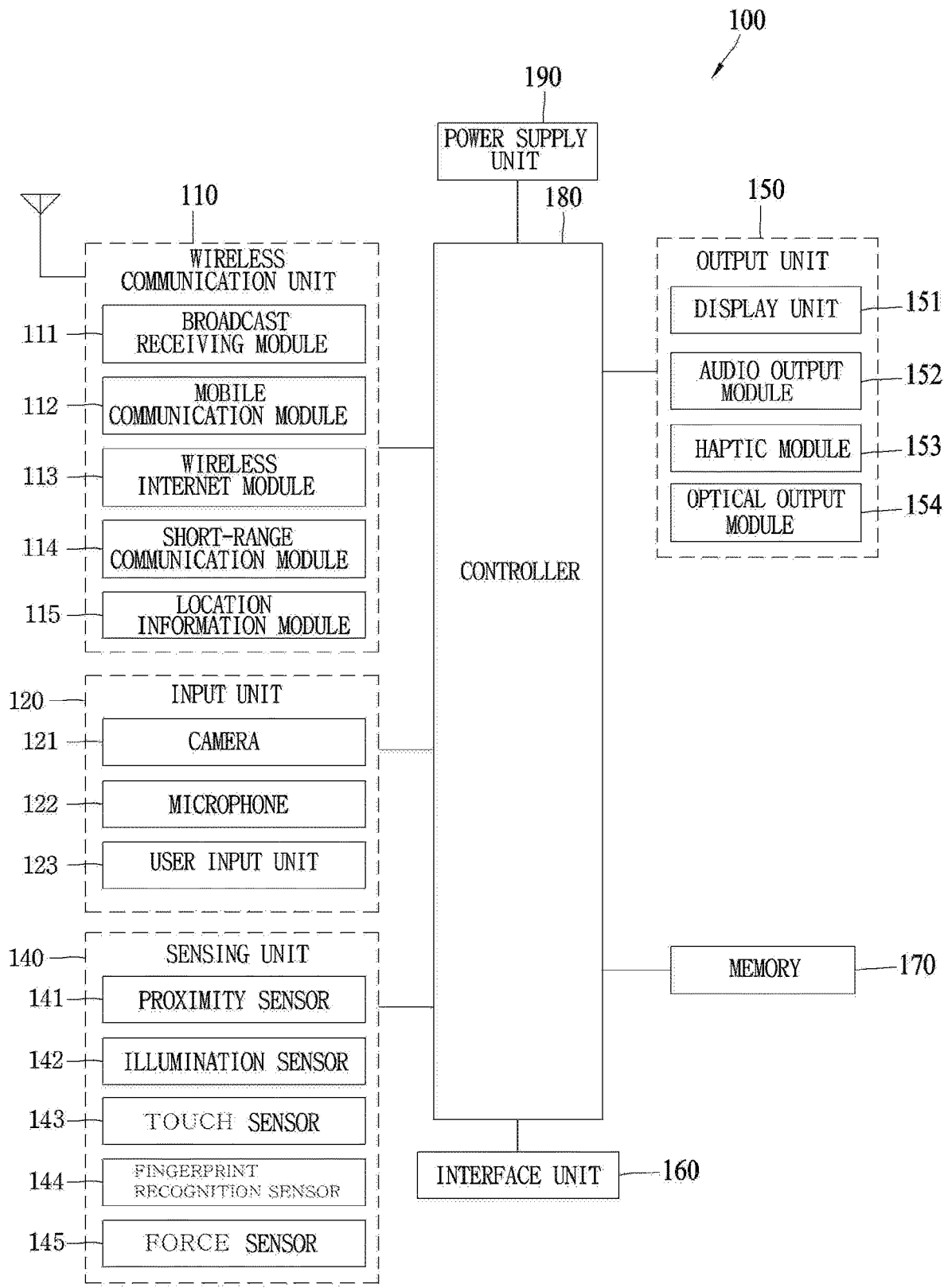
FIG. 1A is a block diagram illustrating a mobile terminal in accordance with the present invention.
Figure 1B:
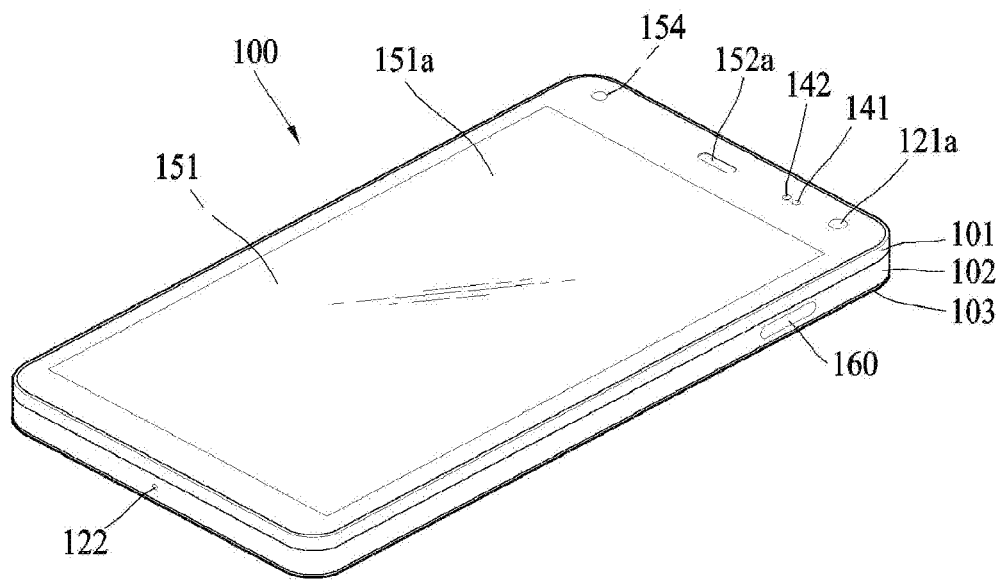
FIGS. 1B and 1C are perspective views of a mobile terminal in accordance with one embodiment of the present invention, as seen from different directions.
Figure 1C:
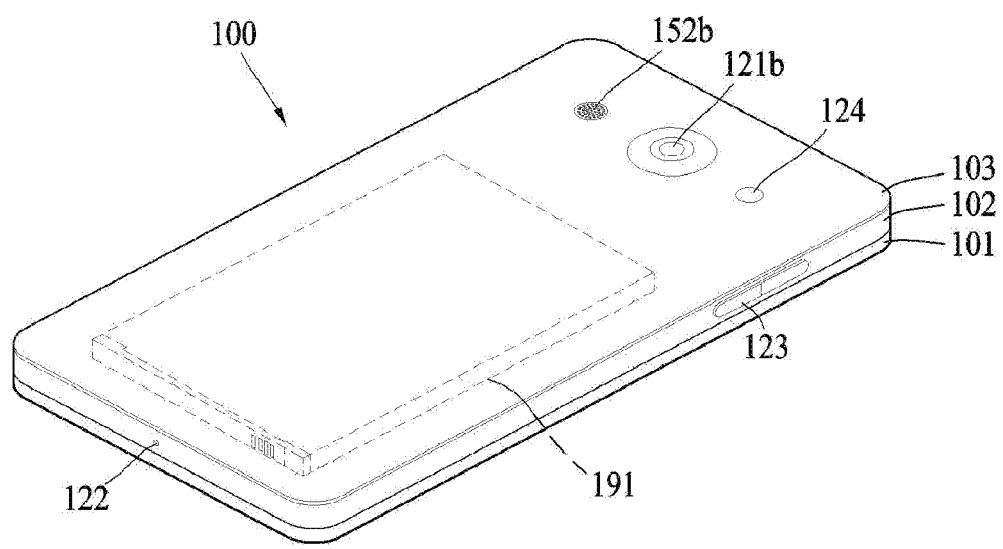

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, it is able to display information processed by the mobile terminal using a flexible display. This is described in detail with reference to the accompanying drawings as follows.

Figure 2:
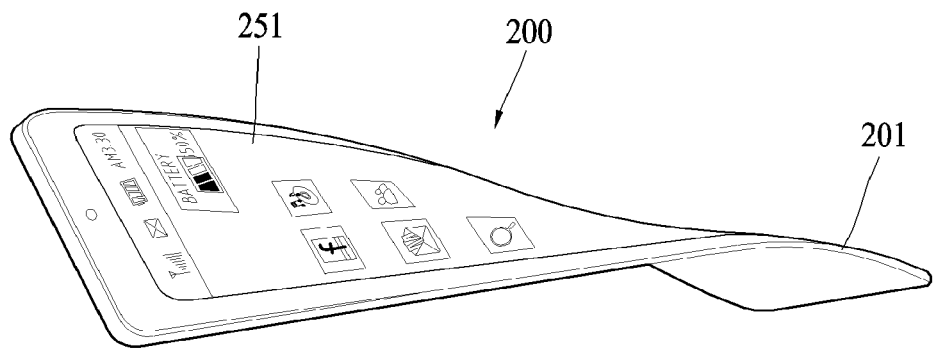
FIG. 2 is a view illustrating a transformable mobile terminal in accordance with another embodiment of the present invention.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
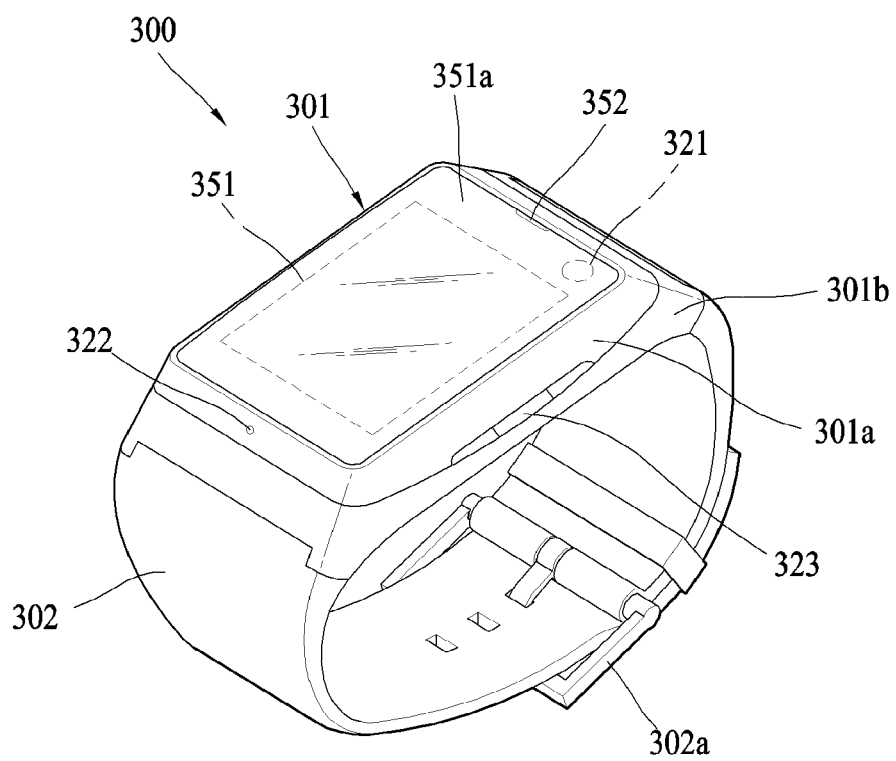
FIG. 3 is a perspective view exemplarily illustrating a watch-type mobile terminal in accordance with another embodiment of the present invention.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
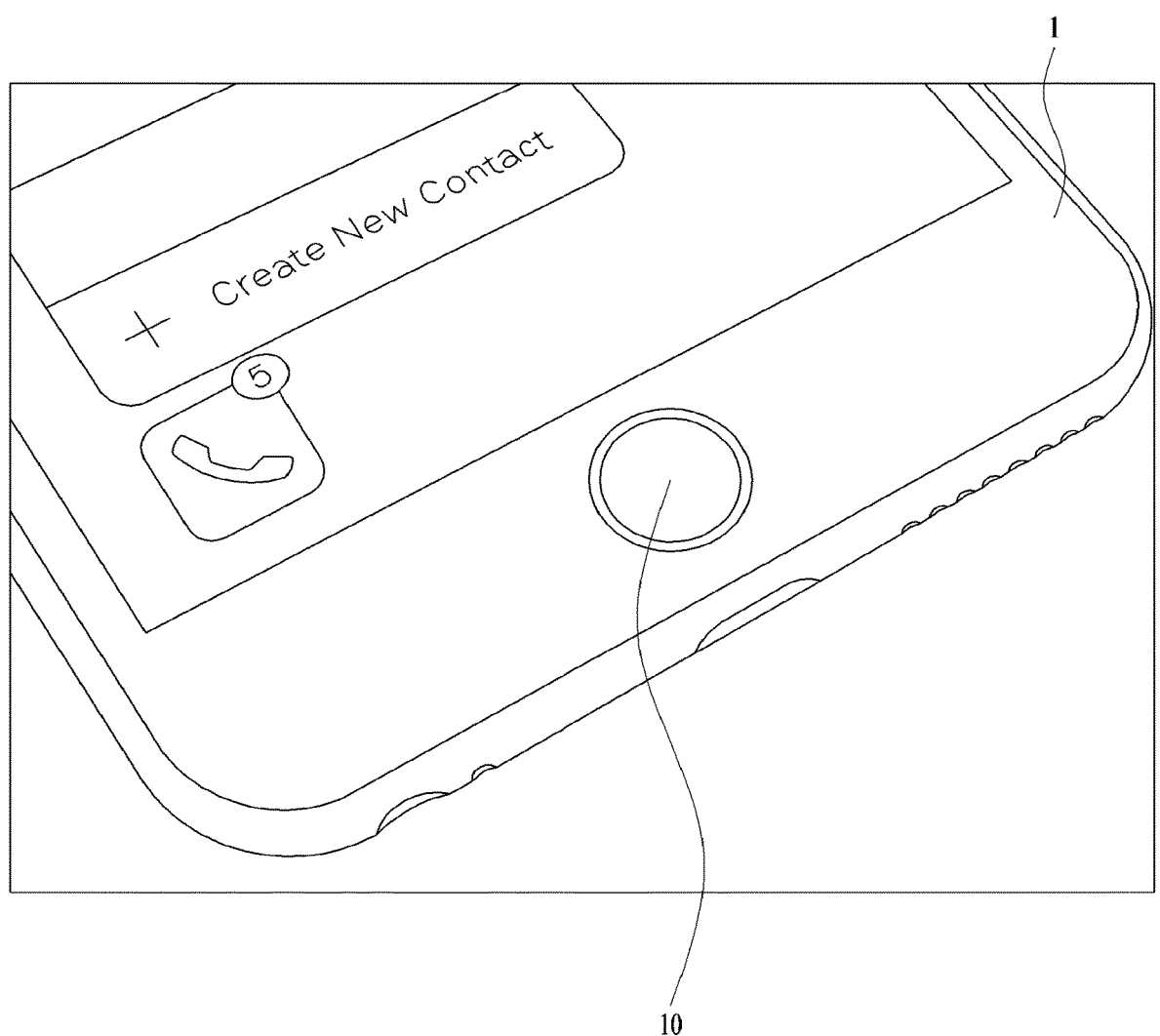
FIG. 4 is a perspective view illustrating a home button formed at a bezel of the lower end of the front surface of a general mobile terminal.

FIG. 4 is a perspective view illustrating a home button 10 formed at a bezel of the lower end of the front surface of a general mobile terminal 1.

Recently, as mobile terminals have been developed, a general mobile terminal has a bar-type terminal body. In the conventional bar-type mobile terminal 1, one home button 10 is formed at a bezel of the lower end of the front surface of the mobile terminal 1. Further, the home button 10 is conventionally formed as a mechanical key. The reason for this is that touch input to a display unit 151 by a user does not provide an operating feeling to the user and, thus, at least the home button 10 provides an operating feeling to the user.

Technology in which the home button 10 includes a fingerprint recognition sensor 14 and a user fingerprint is recognized through the home button 10 has been proposed. Therefore, a user easily inputs a fingerprint through the home button 10 while using the mobile terminal 10. Here, various fingerprint recognition types, such as capacitive, ultrasonic and optical types, may be used in the fingerprint recognition sensor 144. A user's finger may directly contact the home button 10 formed as a mechanical key and, thus, a capacitive fingerprint recognition sensor having a high recognition rate despite a short recognition distance is mainly used.

However, technologies in which the home button 10 is not implemented as a mechanical key but is implemented as a touch key have been proposed now. For example, the home button 10 is formed under a cover glass covering the front surface of the mobile terminal 1 and a part of the cover glass is removed by etching (a glass etching type). Further, the ultrasonic-type fingerprint recognition sensor 144 of the home button 10 is used to recognize a user fingerprint. The reason for this is that a fingerprint recognition distance of the fingerprint recognition sensor 144 is slightly increased due to use of the cover glass.

However, research to reduce a bezel on the front surface of the mobile terminal 1 and to enlarge an area of the display unit 151 is vigorously conducted now. This is to allow a user to see a broad image through the display unit 151 without increase in the size of the mobile terminal 1. However, the home button 10 of the above-described method is only covered by the cover glass and, thus, a bezel area may not be reduced.

In order to solve such a problem, a home button 10 is not separately provided at the bezel and is provided as a touch key at a specific position of the display unit 151. Since the conventional home button 10 formed as a mechanical key provides an operating feeling to a user, the home button 10 further includes a force sensor 145 and an haptic module 153 and thus provides a similar operating feeling to a user so that the user using such a home button 10 does not feel a sense of difference. Further, technology in which the force sensor 145 is disposed under the display unit 151, i.e., is implemented as an under display type, is proposed. However, only the force sensor 145 is actually implemented as an under display type and the fingerprint recognition sensor 144 is not implanted as the under display type. That is, when a user applies touch input of a designated pressure or above to the display unit 151 with a finger 2, the mobile terminal 1 senses the user touch input and provides haptic feedback to the user by outputting vibration. Therefore, the fingerprint recognition sensor 144 is not implemented as the under display type and is thus disposed at a different position, such as on the rear surface of the mobile terminal 1, so as to recognize a user fingerprint.

Figure 5:
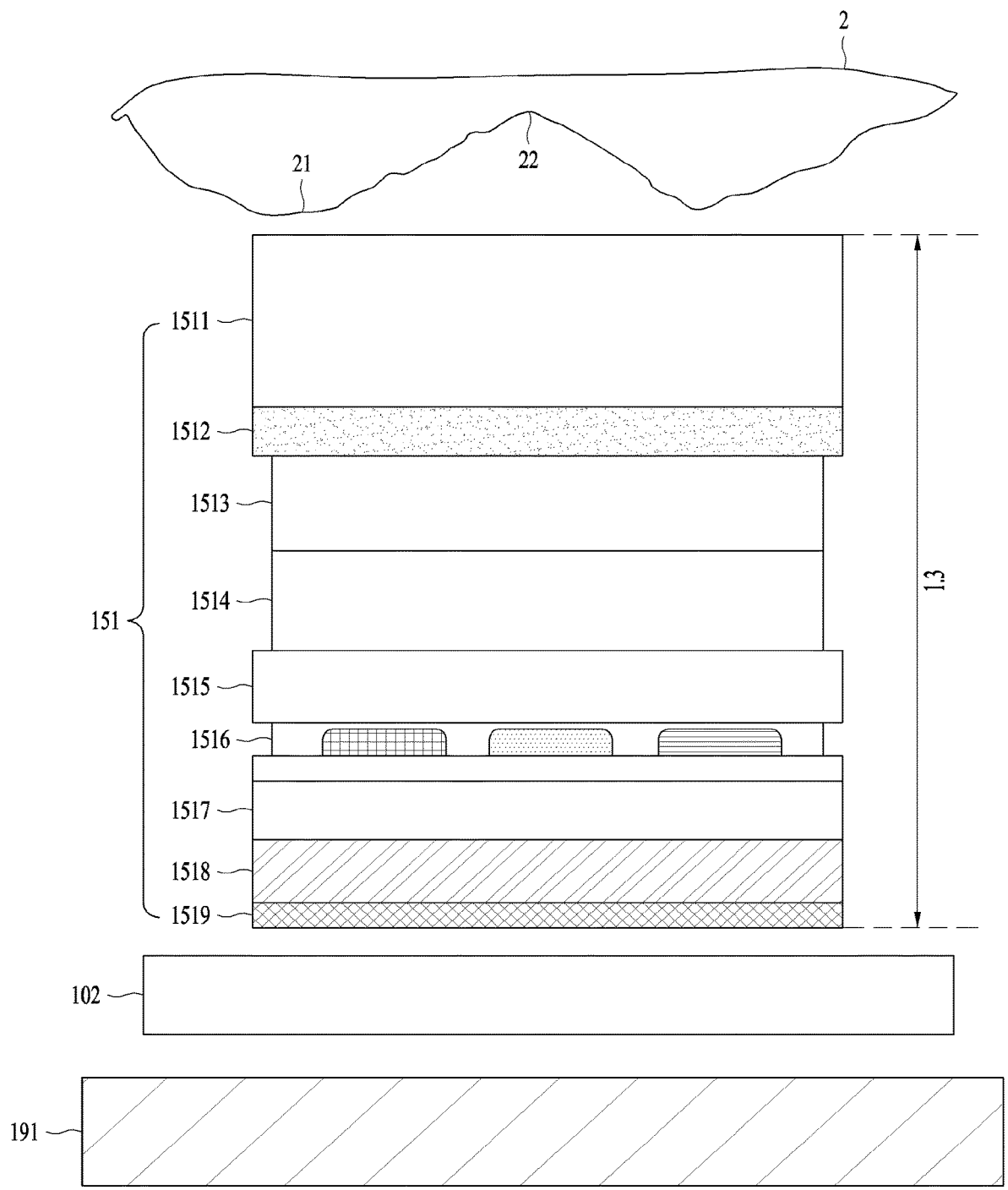
FIG. 5 is a cross-sectional structural view illustrating a general OLED display unit.

FIG. 5 is a cross-sectional structural view illustrating a general OLED display unit 151.

As exemplarily shown in FIG. 5, the OLED display unit 151 generally includes a cover glass 1511, a decorative film 1512, an optical clear adhesive (OCA) film 1513, a polarizer 1514, a touch film 1515, an OLED pixel module 1516, a back plate 1517, a foam pad 1518 and a thermal sheet 1519.

The cover glass 1511 is located at the uppermost portion of the display unit 151 and protects other elements in the display unit 151. The mobile terminal 100 is frequently carried and moved by a user and, thus, there is a high possibility that the mobile terminal 100 will be damaged by external impact or be scratched by a sharp object. The cover glass 1511 needs to have high resistance to impact and scratch and thus tempered glass or sapphire glass is used as the cover glass 1511. However, the disclosure is not limited thereto, and various materials of glass which may protect the elements in the display unit 151 may be used as the cover glass 1511.

The decorative film 1512 shields parts within the mobile terminal 100 without exposure to the outside, and coats the bezel with a designated color and thus provides an aesthetic sense to a user.

The OCA film 1513 is provided between the touch film 1515 and the cover glass 1511 and adheres the touch film 1515 and the cover glass 1511 to each other. In general, the OCA film 1513 is formed of a material having excellent adhesion, transparency and mechanical characteristics, for example, an acrylic material. Further, the OCA film 1513 may have a waterproof function of preventing external moisture from being introduced into the mobile terminal 100.

The polarizer 1541 is formed by stretching poly-vinyl alcohol (PVA) coated with iodine or colored with a dichroic dye. An absorption axis of the polarizer 1541 is formed in a stretching direction and, thus, the polarizer 1541 absorbs light vibrating in a direction parallel to the absorption axis and transmits only light vibrating in a direction perpendicular to the absorption axis.

The touch film 1515 is a film in which the touch sensor 143 sensing touch input applied by a user is formed. A conductive pattern formed of a conductive material may be formed on the touch film 1515. The touch film 1515 may include an Rx electrode which receives a signal of user touch input and a Tx electrode which converts the signal of the touch input into an electrical signal and transmits the electrical signal to the controller 180. The touch film 1515 may be formed of a light transmitting material, for example, polycarbonate (PC) or polyethylene terephthalate (PET).

The OLED pixel module 1516 is a pixel module including R, G and B sub-pixels having a self light-emitting function. The respective sub-pixels use an organic phosphor compound, and electrons and positively charged particles injected from a cathode and an anode are combined and may thus autonomously emit light. Therefore, separate liquid crystal molecules or back light is not necessary.

The back plate 1517 is a film formed of an acrylic adhesive layer and serves as a reinforcing plate on the rear surface of the OLED pixel module 1516.

The foam pad 1518 absorbs external impact applied to the display unit 151 and thus reduces impact which will be applied to other elements of the display unit 151. For this purpose, the foam pad 1518 may be generally formed of an elastic material, such as rubber or urethane.

The thermal sheet 1519 dissipates heat from elements which generate a large quantity of heat, such as the OLED display unit 151 or a main board, to the outside. For this purpose, the thermal sheet 1519 is generally manufactured using a material having a relatively high thermal conductivity, for example, a metal such as copper or a carbon material such as graphite.

The embodiments of the present invention are not limited by the above-described elements of the display unit 151 and, thus, some elements may be omitted or substituted with other elements, the sequence of these elements may be changed or new elements may be added.

As described above, if the home button 10 is formed as touch key at a specific position on the display unit 151, the fingerprint recognition sensor 141 cannot be conventionally implemented as an under display type. However, in order to implement the fingerprint recognition sensor 141 as an under display type, it is important to increase a recognition distance of the fingerprint recognition sensor 144. In order to allow a user to monitor an image displayed through the display unit 151 without disturbance, the fingerprint recognition sensor 144 must be located under the display unit 151. However, as exemplarily shown in FIG. 5, the existing OLED display unit 151 has a considerably great thickness of about 1.3 mm and thus a recognition rate of the conventional capacitive fingerprint recognition sensor 144 is not high.

Figure 6:
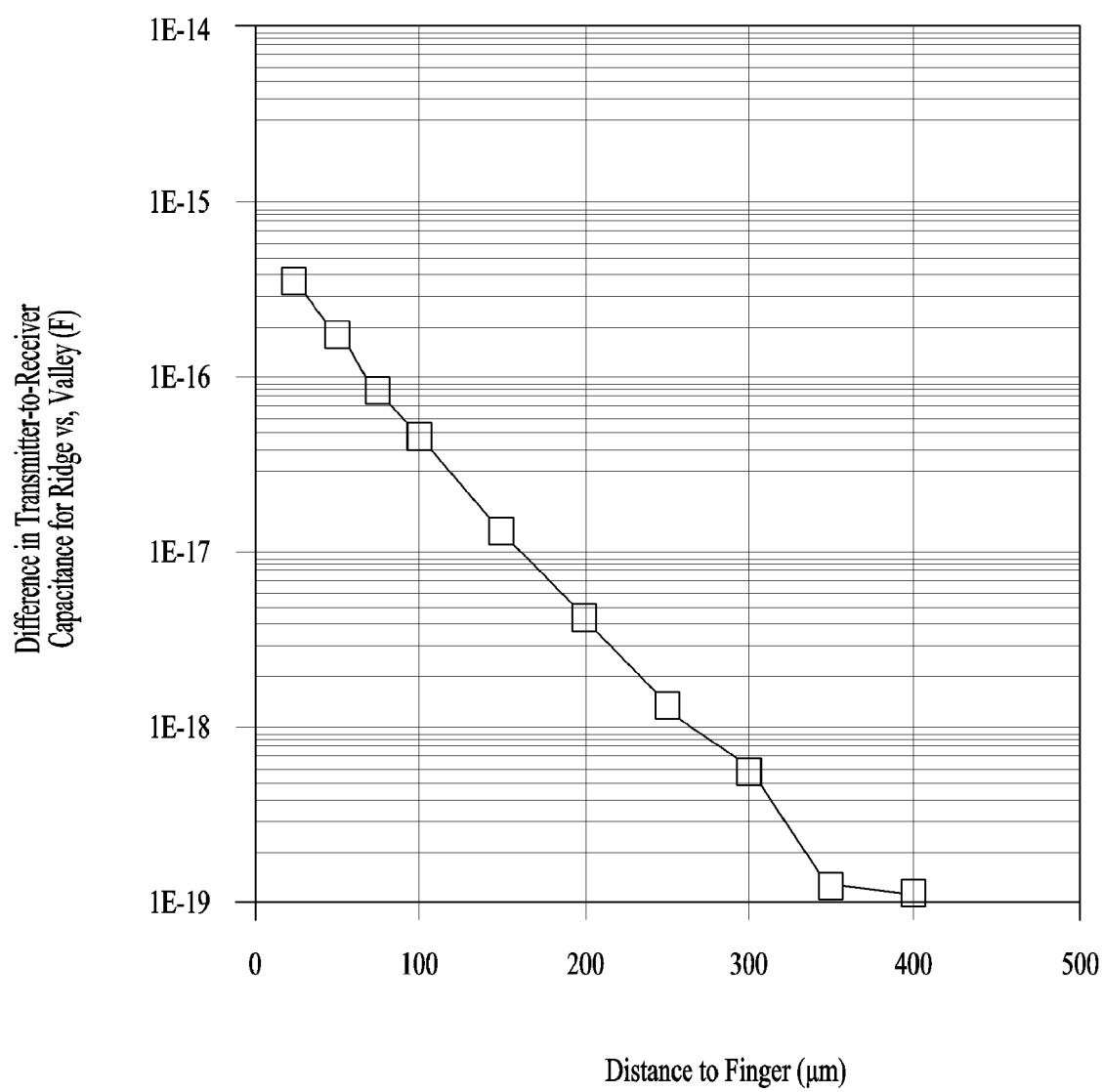
FIG. 6 is a graph representing sensitivity of a capacitive fingerprint recognition sensor, acquired by an experiment.

FIG. 6 is a graph representing sensitivity of the capacitive fingerprint recognition sensor 144, acquired by an experiment.

In FIG. 6, the horizontal axis represents a distance from the capacitive fingerprint recognition sensor 144 to a finger 2, and the vertical axis represents a difference of signals between ridges 21 and a valleys 22 of a fingerprint formed on the finger 2.

Experimentally, as exemplarily shown in FIG. 6, as a distance is increased by 0.1 mm, signal attenuation occurs by about nine fold. Further, the maximum recognition distance of the capacitive fingerprint recognition sensor 144 is only 0.3 mm. Although not shown in this figure, if the fingerprint recognition sensor 144 is an ultrasonic type, the ultrasonic fingerprint recognition sensor 144 has a maximum recognition distance of 1 mm, which is slightly greater than that of the capacitive fingerprint recognition sensor 144. However, if the fingerprint recognition sensor 144 is an optical type, the optical fingerprint recognition sensor 144 may recognize a fingerprint up to a distance of about 1.6 mm. Although the fingerprint recognition sensor 144 in accordance with one embodiment of the present invention may be one of various types, such as a capacitive type, an ultrasonic type, etc., the thickness of the existing OLED display unit 151 is about 1.3 mm and, thus, an optical fingerprint recognition sensor having the greatest maximum recognition distance may be used.

Figure 7:
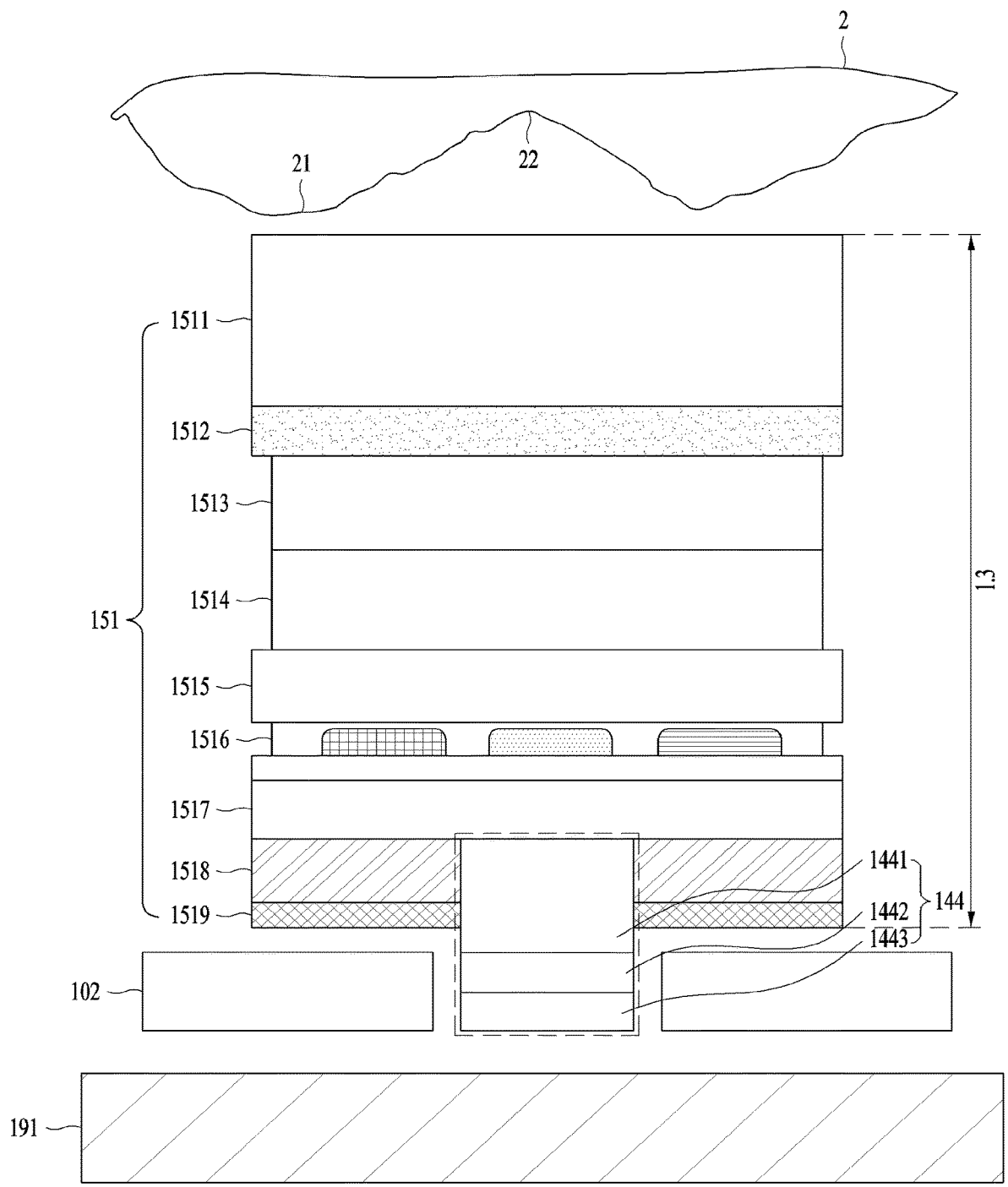
FIG. 7 is a cross-sectional structural view illustrating a display unit provided with a fingerprint recognition sensor.

FIG. 7 is a cross-sectional structural view illustrating the display unit 151 provided with the fingerprint recognition sensor 144 installed therein.

In order to use the optical fingerprint recognition sensor 144, light emitted to the outside is reflected by the finger 2, and the reflected light is transmitted by the display unit 151 and then incident upon the fingerprint recognition sensor 144. The display unit 151 may be various types, such as LCD, TFT LED and OLED types, as described above, but, in order to allow the display unit 151 to transmit light, emitted to the outside and reflected by the finger 2, the OLED display unit 151 must be used. Particularly, the display unit 151 may be transparent to be observed from the outside. Such a display unit 151 may be referred to as a transparent display unit, and there is a transparent OLED display as a representative example of the transparent display unit. On the other hand, an LCD or TFT LCD display unit does not have a self light-emitting function, and includes liquid crystals provided therein and thus does not transmit reflected light. That is, the display unit 151 in accordance with one embodiment of the present invention may be an OLED type which may have a self light-emitting function and transmit light, emitted to the outside and reflected by the finger 2.

As exemplarily shown in FIG. 7, in order to install the optical fingerprint recognition sensor 144 under the OLED display unit 151, a part of a light non-transmitting layer of the display unit 151 is removed. As described above, in order to allow reflected light to be incident upon the fingerprint recognition sensor 144, the display unit 151 must transmit the reflected light. Here, the cover glass 1511, the decorative film 1512, the OCA film 1513, the polarizer 1514, the touch film 1515, the OLED pixel module 1516 and the back plate 1517 are formed of light transmitting materials and may thus transmit the reflected light. However, the foam pad 1518 and the thermal sheet 1519 are formed of materials which do not transmit light due to intrinsic characteristics thereof and thus form the light non-transmitting layer. As described above, the foam pad 1518 is generally formed of an elastic material, such as rubber or urethane, and the thermal sheet 1519 is generally formed of a material having a relatively high thermal conductivity, for example, a metal such as copper or a carbon material such as graphite. These materials are materials which do not transmit light. A portion of the light non-transmitting layer 1518 and 1519 corresponding to an installation position of the fingerprint recognition sensor 144 is perforated. Then, an insertion space into which the fingerprint recognition sensor 144 is inserted is formed at the perforated portion. As exemplarily shown in FIG. 7, the fingerprint recognition sensor 144 may be installed in the display unit 151 by inserting the fingerprint recognition sensor 144 into the insertion space such that a light receiver 1441 of the fingerprint recognition sensor 144 faces upward.

Here, only if the fingerprint recognition sensor 144 is inserted into the insertion space such that the light receiver 1441 contacts the light transmitting layer 1511, 1512, 1513, 1514, 1515, 1516 and 1517, a fingerprint recognition rate may be increased. However, since the OLED pixel module 1516 directly emitting light may not be perforated, the light receiver 1441 is located below the OLED pixel module 1516 as long as the light receiver 1441 is located at the closest position to the user finger 2. Therefore, in accordance with embodiments of the present invention, the OLED pixel module 1516 emitting light and the light receiver 1441 receiving light are installed in different layers.

Figure 8:
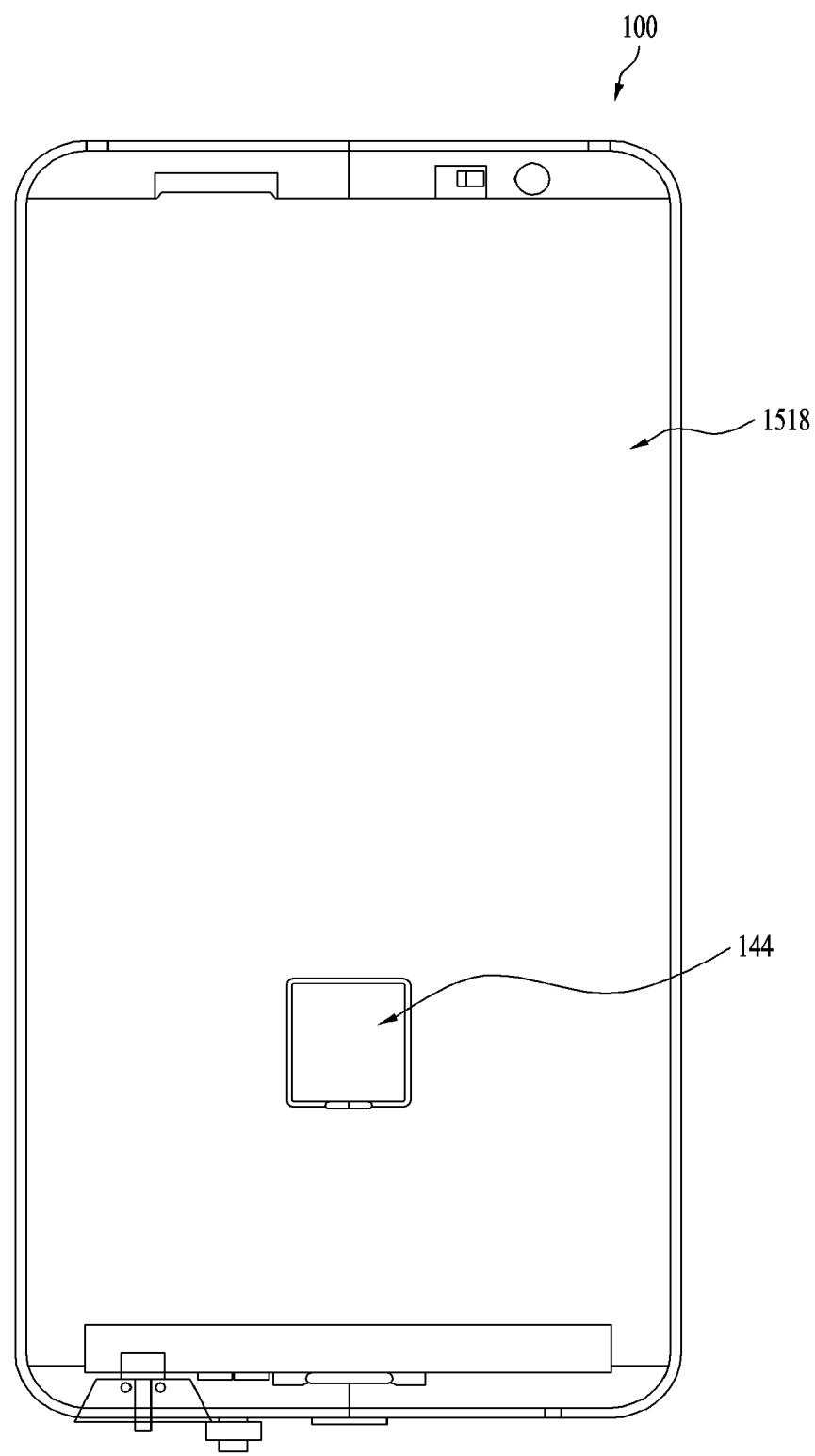
FIG. 8 is a front view of a mobile terminal provided with a fingerprint recognition sensor, from which a light transmitting layer of a display unit is removed.

FIG. 8 is a front view of the mobile terminal 100 provided with the fingerprint recognition sensor 144, from which the light transmitting layer 1511, 1512, 1513, 1515, 1516 and 1517 of the display unit 151 is removed.

The fingerprint recognition sensor 144 installed through the above-described method may be installed at a height corresponding to about ¼ of the overall height of the display unit 151 from the lower end of the display unit 151, as exemplarily shown in FIG. 8. Since other elements, such as a driver circuit board controlling the display unit 151, etc., may be disposed around the lowermost region of the mobile terminal 100, it is difficult to install the fingerprint recognition sensor 144 at the lowermost region of the mobile terminal 100. Further, if the fingerprint recognition sensor 144 is disposed at the upper region of the mobile terminal 100 above the center of the mobile terminal 100, when a user touches the mobile terminal 100 for fingerprint recognition by a finger 2, a user's hand or arm may shield the display unit 151 and may thus obstruct a user's view.

Figure 9:
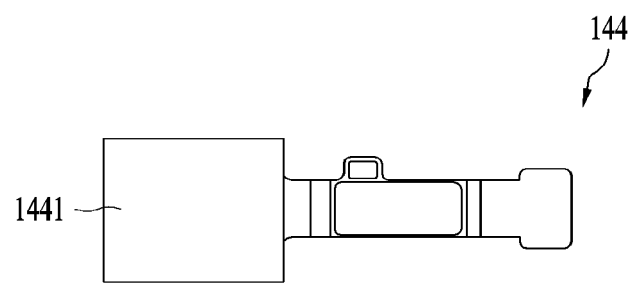
FIG. 9 is a front view of the fingerprint recognition sensor.
Figure 10:
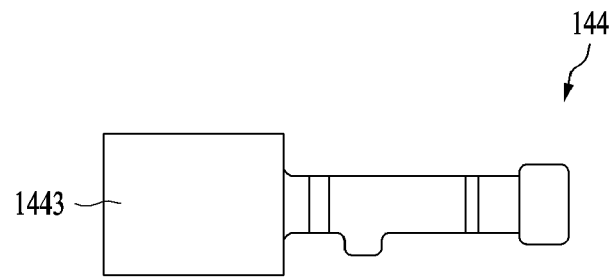
FIG. 10 is a rear view of the fingerprint recognition sensor.

FIG. 9 is a front view of the fingerprint recognition sensor 144, and FIG. 10 is a rear view of the fingerprint recognition sensor 144.

As exemplarily shown in FIG. 7, the fingerprint recognition sensor 144 includes the light receiver 1441, a flexible printed circuit board (FPCB) 1442 and a stiffener 1443.

The light receiver 1441 is mounted on the upper surface of the FPCB 1442, and the stiffener 1443 is attached to the lower surface of the FPCB 1442. Thereby, the stiffener 1443, the FPCB 1442 and the light receiver 1441 may be stacked in order.

The light receiver 1441 receives reflected light transmitted by the display unit 151 and thus recognizes a fingerprint of the user finger 2. As described above, since, if the fingerprint recognition sensor 144 is implemented as an under display type, a distance from the fingerprint recognition sensor 144 to the user finger 2 is long, the optical fingerprint recognition sensor 144 having the greatest recognition distance is used.

The stiffener 1443 serves as a stiffening member to improve strength of the fingerprint recognition sensor 144.

The upper and lower surfaces of the light receiver 1441, the FPCB 1442 and the stiffener 1443 have similar shapes and areas. Therefore, as exemplarily shown in FIG. 9, the light receiver 1441 alone may be seen from one surface of the fingerprint recognition sensor 144 and, as exemplarily shown in FIG. 10, the stiffener 1443 alone may be seen from the other surface of the fingerprint recognition sensor 144.

Figure 11:
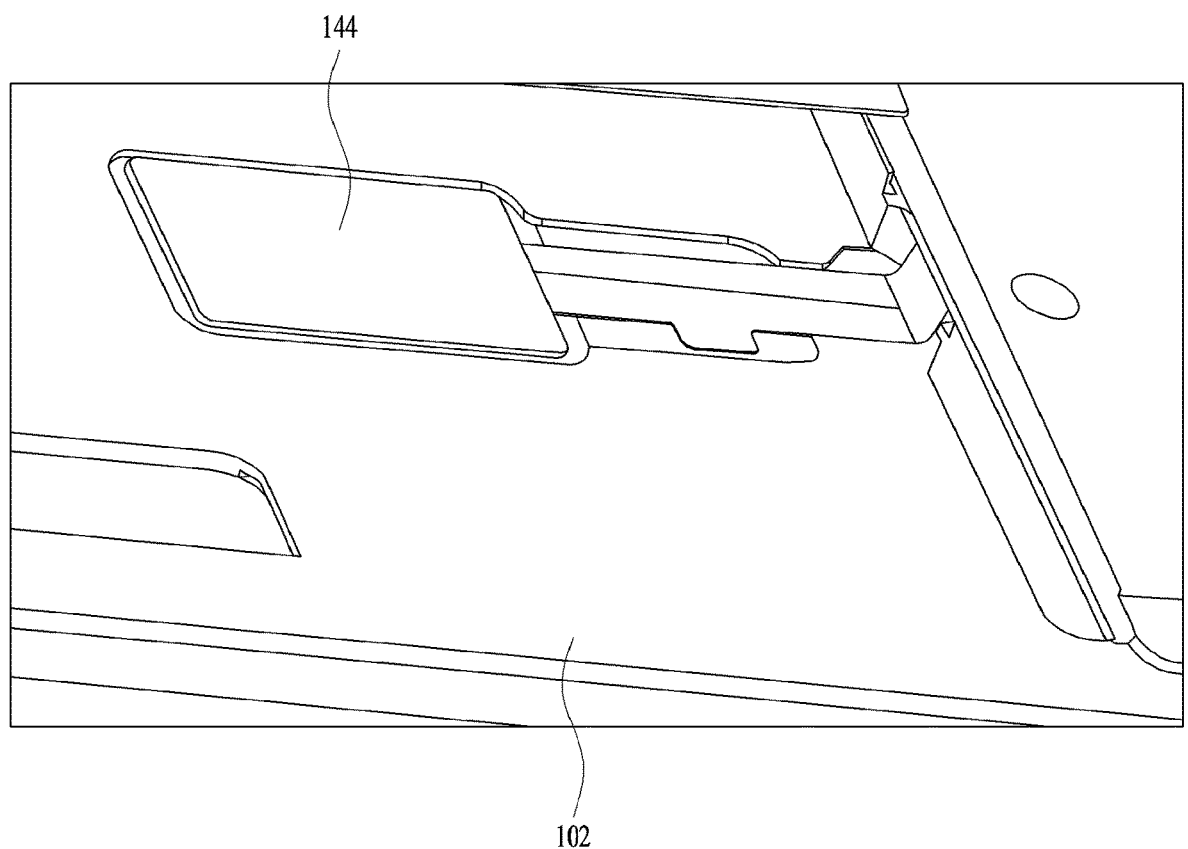
FIG. 11 is a rear perspective view illustrating the fingerprint recognition sensor inserted into an insertion space.

FIG. 11 is a rear perspective view illustrating the fingerprint recognition sensor 144 inserted into the insertion space.

When the fingerprint recognition sensor 144 is inserted into the insertion space, the light receiver 1441 contacts the light-emitting layer 1511, 1512, 1513, 1514, 1515, 1516 and 1517, as described above. As exemplarily shown in FIG. 11, the rear surface of the fingerprint recognition sensor 144 is exposed to the outside. Here, the stiffener 1443 is attached to the rear surface of the fingerprint recognition sensor 144. The stiffener 1443 is formed of a material having high resistance to impact and scratch and thus protects the fingerprint recognition sensor 144. Further, as exemplarily shown in FIG. 11, when the fingerprint recognition sensor 144 is inserted into the insertion space, the fingerprint recognition sensor 144 does not protrude from a rear case 102, thus not forming any stepped portion. However, if the force sensor 145 and the fingerprint recognition sensor 144 are stacked, the fingerprint recognition sensor 144 protrudes from the rear case 102 by a thickness of the force sensor 145 and thus forms a stepped portion. This will be described in detail later.

Figure 12:
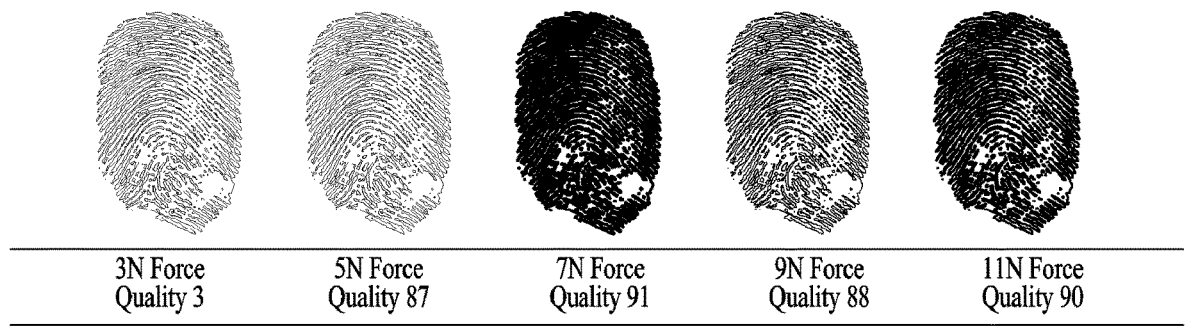
FIG. 12 is a view illustrating shapes of a fingerprint recognized by the fingerprint recognition sensor, when a user applies pressure of various magnitudes to a specific position of a display unit in accordance with one embodiment of the present invention with their finger.
Figure 13:
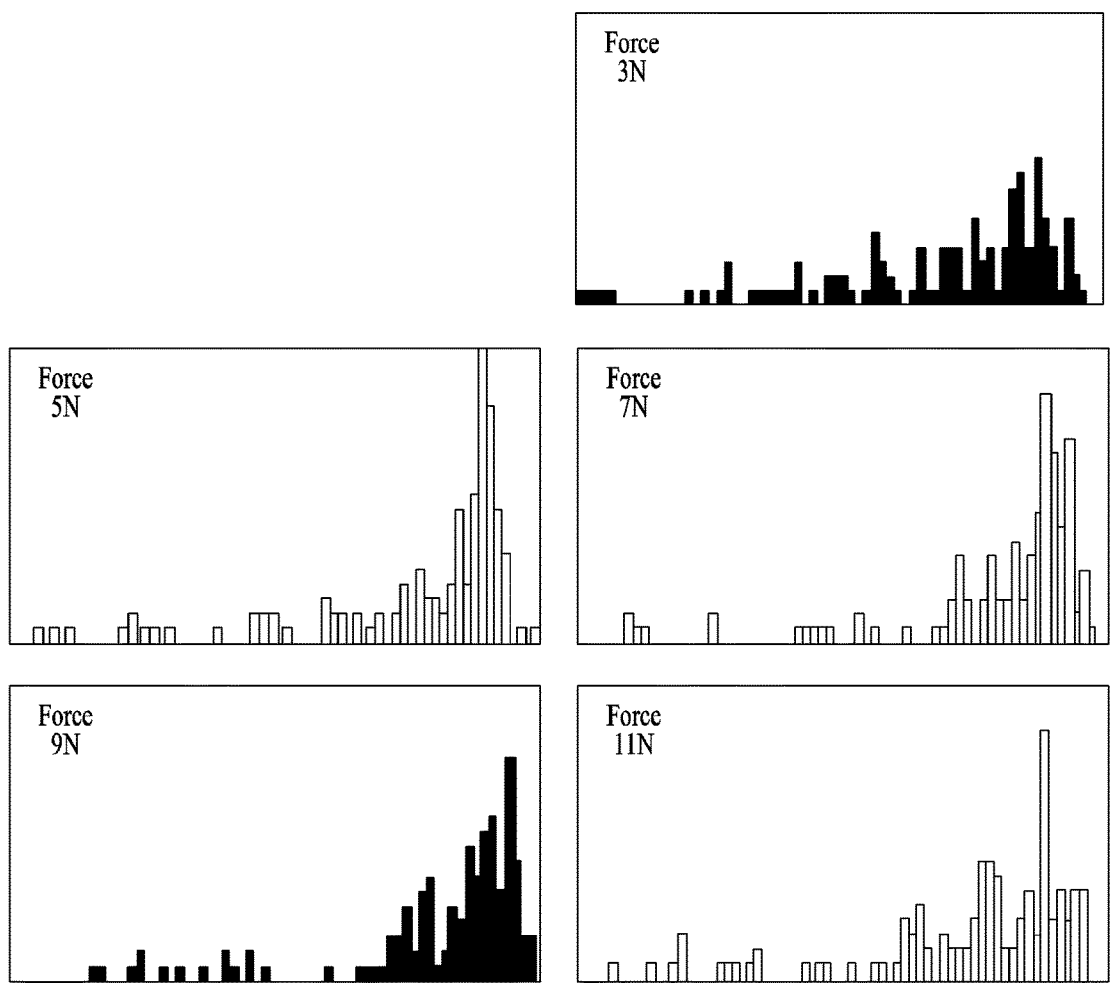
FIG. 13 is a view illustrating graphs representing signal intensities of the fingerprint, received by the fingerprint recognition sensor of FIG. 12.

FIG. 12 is a view illustrating shapes of a fingerprint recognized by the fingerprint recognition sensor 144, when a user applies pressure of various magnitudes to a specific position of the display unit 151 in accordance with one embodiment of the present invention with a finger 2, and FIG. 13 is a view illustrating graphs representing signal intensities of the fingerprint, received by the fingerprint recognition sensor 144 of FIG. 12.

The optical fingerprint recognition sensor 144 may not read information regarding the dermis of the user finger 2 and may read only information regarding the epidermis of the user finger 2, differently from a capacitive fingerprint recognition sensor. Therefore, in order to allow the fingerprint recognition sensor 144 to recognize a fingerprint, strong pressure of a designated magnitude must be applied. As exemplarily shown in FIG. 12, if the user presses a specific position of the display unit 151 where the fingerprint recognition sensor 144 is located, by force of 3N with the finger 2, the fingerprint recognition sensor 144 unclearly recognizes a fingerprint and thus has difficulty in identifying the fingerprint. However, if the user presses the specific position of the display unit 151 where the fingerprint recognition sensor 144 is located, by force of 5N with the finger 2, the fingerprint recognition sensor 144 pretty clearly recognizes the fingerprint and may thus easily identify the fingerprint. Further, if the user presses the specific position of the display unit 151 where the fingerprint recognition sensor 144 is located, by force of 7N with the finger 2, the fingerprint recognition sensor 144 very clearly recognizes the fingerprint. Further, as exemplarily shown in FIG. 13, in case of force of 3N, a signal of the fingerprint recognized by the fingerprint recognition sensor 144 is weak. However, in case of force of more than 5N, a signal of the fingerprint recognized by the fingerprint recognition sensor 144 is very strong.

In order to increase a fingerprint recognition rate of the fingerprint recognition sensor 144, the user must press the specific position at strong pressure of a designated magnitude with the finger 2. In order to induce the user to press the specific position at strong pressure of a designated magnitude with the finger 2, the force sensor 145 and the haptic module 153 are necessary. For example, if a threshold sis et to 5N, when the user presses the specific position at pressure of 5N or more with the finger 2, the force sensor 145 recognizes that force of the threshold or more is applied and thus generates a signal. Then, when the force sensor 145 transmits the signal to the haptic module 153, the haptic module 153 directly generates a haptic effect, such as vibration. Thereby, the user may recognize that the user sufficiently strongly presses the specific position at pressure of the threshold or more.

In the above experiment, pressure is not applied but force is applied, and pressure and force are different physical quantities. However, pressure may be deduced through simple calculation, i.e., by dividing force by the area of the fingerprint recognition sensor 144. Although, in the above experiment, force is applied to the fingerprint recognition sensor 144, the area of the fingerprint recognition sensor 144 is not changed and thus it will be apparent to those skilled in the art that pressure may be easily deduced from force.

If the home button 10 is formed as a touch key, the home button 10 does not provide an operating feeling which is provided by the conventional mechanical key. Therefore, the user cannot know whether or not fingerprint recognition is normally executed while continuously contacting the specific position with the finger 2. Accordingly, in order to provide an operating feeling to the user and to inform the user of whether or not execution of the fingerprint recognition is completed, the force sensor 145 and the haptic module 153 are necessary.

When the user presses the specific position with the finger 2, the force sensor 145 recognizes that the pressure is applied and generates a signal. Such a signal may be transmitted not only to the haptic module 153 but also to the display unit 151 and the fingerprint recognition sensor 144. When the display unit 151 receives the signal, the OLED pixel module 1516 of the display unit 151 emits light to a region corresponding to the specific position pressed by the user. Then, light reflected by the user finger 2 is incident upon the fingerprint recognition sensor 144. When the fingerprint recognition sensor 144 receives the signal, the fingerprint recognition sensor 144 recognizes that light will be incident upon the fingerprint recognition sensor 144, and enters a wake-up mode in advance. Thereafter, when reflected light is incident upon the fingerprint recognition sensor 144, the fingerprint recognition sensor 144 recognizes a fingerprint of the finger 2 through the reflected light.

When the haptic module 153 receives the signal from the force sensor 145, the haptic module 153 may directly generate a haptic effect, as described above. However, the disclosure is not limited thereto, and the haptic module 153 may receive a signal, separately generated from the fingerprint recognition sensor 144 when the fingerprint recognition sensor 144 receives the fingerprint, and generate the haptic effect. If the haptic module 153 receives a signal generating the haptic effect from the force sensor 145, the haptic module 153 may inform the user that pressure of the threshold or more has been received and, if the haptic module 153 receives the signal from the fingerprint recognition sensor 144, the haptic module 153 may inform the user that execution of the fingerprint recognition has been normally completed. That is, the haptic module 153 may provide a haptic feedback function which generates a haptic effect when the haptic module 153 receives input, as long as the haptic module 153 may inform the user of various pieces of information.

Current consumption of the optical fingerprint recognition sensor 144 is about 18 mA and, thus, the optical fingerprint recognition sensor consumes a large quantity of current. Since the respective OLED sub-pixels of the OLED display unit 151 autonomously emit light, the OLED display unit 151 also consumes a large quantity of current. Further, the home button 10 is operated as a touch key and, thus, even if the user simply grasps the mobile terminal 100 by hand regardless of user intention, when the user finger 2 accidently contacts the display unit 151, the fingerprint recognition sensor 144 may enter the wake-up mode. If the fingerprint recognition sensor 144 enters the wake-up mode by simple contact of the finger 2 with the display unit 151, current consumption increases and, thus, the battery 191

(shown in FIG. 1C) may be early discharged. In order to solve such a problem, the force sensor 145 and the haptic module 135 are necessary. That is, if the user applies pressure of the threshold or more, the force sensor 145 may sense the pressure and transmit a signal to the fingerprint recognition sensor 144 and the fingerprint recognition sensor 144 may enter the wake-up mode. Therefore, current consumption may be reduced and early discharge of the battery 191 may be prevented.

Figure 14:
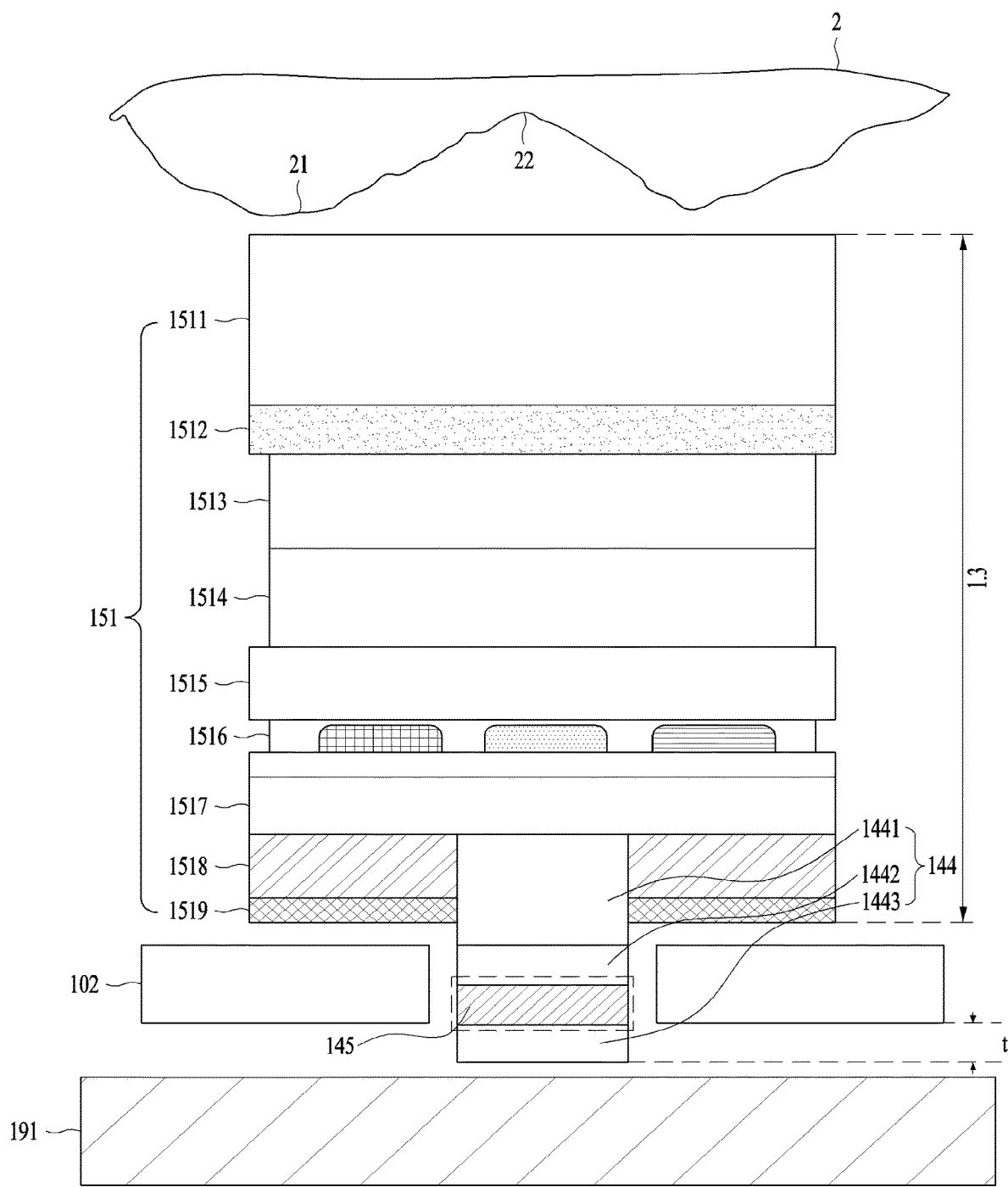
FIG. 14 is a cross-sectional structural view illustrating a force sensor stacked between other elements within the fingerprint recognition sensor.
Figure 15:
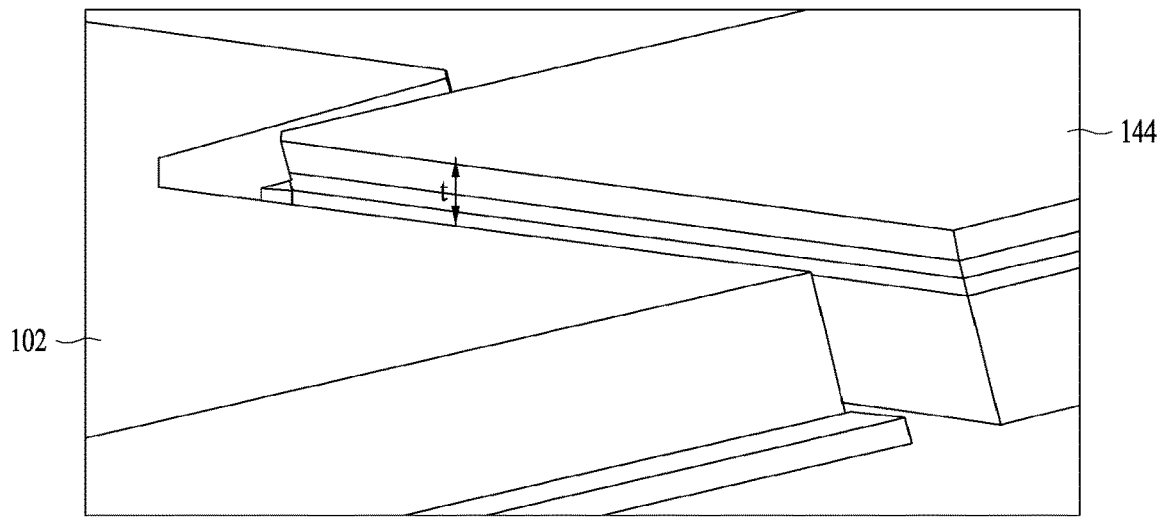
FIG. 15 is a rear perspective view illustrating the fingerprint recognition sensor of FIG. 14 inserted into the insertion space.

FIG. 14 is a cross-sectional structural view illustrating the force sensor 145 stacked between other elements within the fingerprint recognition sensor 144, and FIG. 15 is a rear perspective view illustrating the fingerprint recognition sensor 144 of FIG. 14 inserted into the insertion space.

As described above, in order to implement the fingerprint recognition sensor 141 as an under display type for various reasons, the force sensor 145 and the haptic module 153 are necessary for various reasons. Here, when a user applies touch input to a specific position, recognition of a user fingerprint and sensing of pressure may be simultaneously performed. For this purpose, the force sensor 145 may be disposed at a position on the display unit 151, equal or similar to the position of the fingerprint recognition sensor 144. As exemplarily shown in FIG. 14, if the force sensor 145 is stacked between the elements of the fingerprint recognition sensor 144, the positions of the fingerprint recognition sensor 144 and the force sensor 145 on the display unit 151 exactly coincide with each other. However, as exemplarily shown in FIGS. 14 and 15, the thickness of the fingerprint recognition sensor 144 is increased by the thickness t of the force sensor 145 and thus the fingerprint recognition sensor 144 protrudes from the rear case 102.

If the fingerprint recognition sensor 144 protrudes from the rear case 102 and thus the stepped portion is formed, the overall thickness of the mobile terminal 100 is increased. Therefore, the mobile terminal 100 may not provide an aesthetic design to the user. Further, when the user grasps or carries the mobile terminal 100 by hand, usability of the mobile terminal 100 may be lowered. In order to maintain the overall thickness of the mobile terminal 100 even if the fingerprint recognition sensor 144 protrudes from the rear case 102, a method of reducing the thickness of the battery 191 (in FIG. 1C) is proposed but, in this case, the capacity of the battery 191 may be also lowered.

Figure 16:
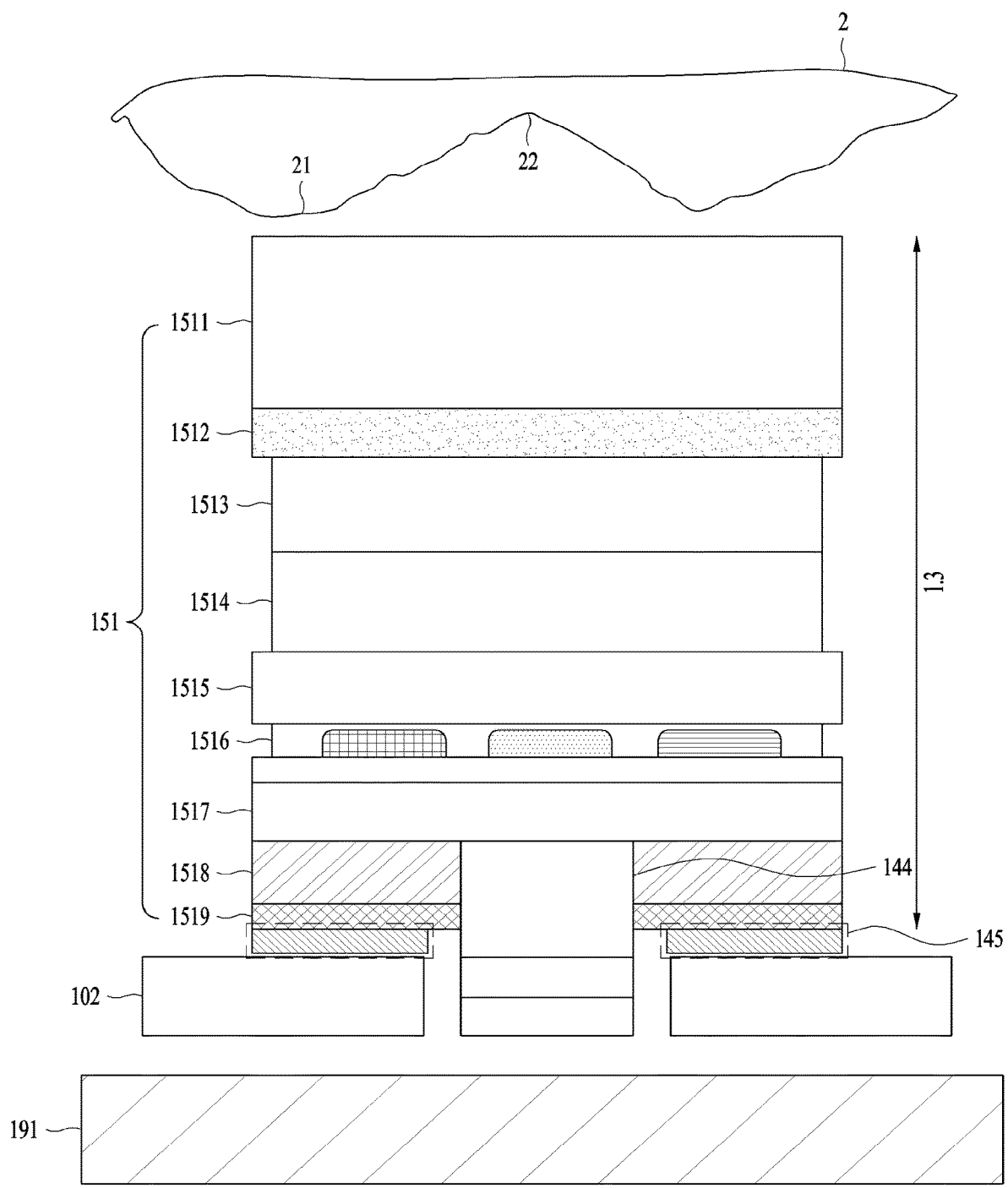
FIG. 16 is a cross-sectional structural view illustrating a display unit including a force sensor in accordance with one embodiment of the present invention.
Figure 17:
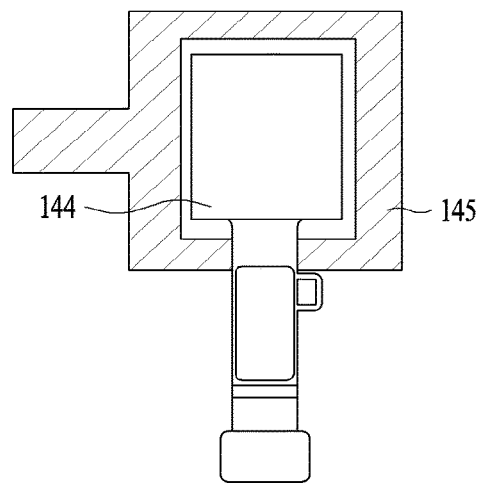
FIG. 17 is a front view illustrating a fingerprint recognition sensor and the force sensor in accordance with one embodiment of the present invention.

FIG. 16 is a cross-sectional structural view illustrating a display unit 151 including a force sensor 145 in accordance with one embodiment of the present invention, and FIG. 17 is a front view illustrating a fingerprint recognition sensor 144 and the force sensor 145 in accordance with one embodiment of the present invention.

In accordance with one embodiment of the present invention, as exemplarily shown in FIGS. 16 and 17, the force sensor 145 is disposed so as to surround the side surface of the fingerprint recognition sensor 144. As exemplarily shown in FIGS. 5 and 7, a designated interval is formed between the display unit 151 and the rear case 102. Such an interval is an offset intentionally included in a design stage. When the mobile terminal 100 is manufactured, design sizes may differ from actual sizes due to process errors, assembly tolerances, etc. In this case, assembly of parts may be impossible or, even if the parts are assembled, the parts may be deformed by stress or fatigue of the parts may occur. Therefore, an offset of a certain degree is generally prepared in design. The length of such an offset is about 0.35 mm.

In accordance with one embodiment of the present invention, as exemplarily shown in FIG. 16, the force sensor 145 is inserted into the interval provided as the offset. Such an offset is removed by inserting the force sensor 145 into the interval, but the force sensor 145 does not have a large area and does not disturb assembly of parts.

A hole having a size or a shape corresponding to those of the fingerprint recognition sensor 144 is formed through the center of the force sensor 145. Therefore, the force sensor 145 has a ring shape provided with a hole formed at the center thereof and thus the force sensor 145 having a designated width surrounds the side surface of the fingerprint recognition sensor 144. The width of the force sensor 145 may be uniform or be varied at the respective edges of the force sensor 145. For example, as exemplarily shown in FIG. 17, the fingerprint recognition sensor 144 may have a rectangular shape. In this case, a rectangular hole having a size and a shape corresponding to those of the fingerprint recognition sensor 144 is formed at the center of the force sensor 145. Therefore, the force sensor 145 may have a rectangular ring shape. However, the disclosure is not limited thereto, and the fingerprint recognition sensor 144 may have various shapes, such as a circular shape, a hexagonal shape, etc., and the force sensor 145 may have various shapes corresponding thereto.

Figure 18:
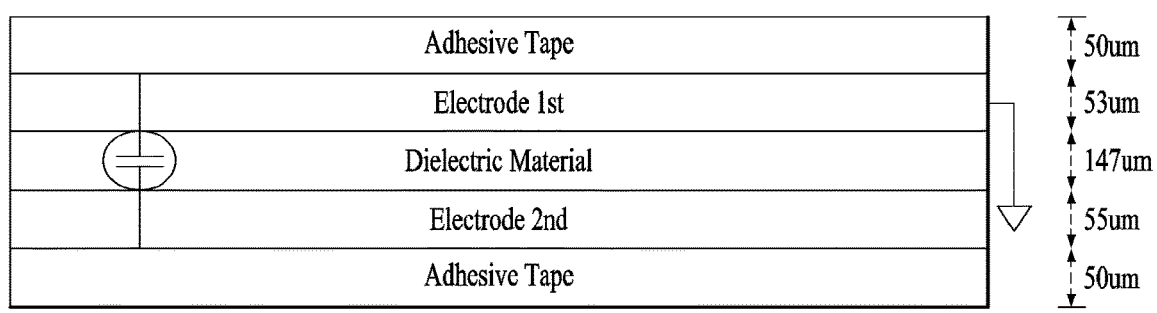
FIG. 18 is a cross-sectional structural view of the display unit, if the force sensor in accordance with one embodiment of the present invention is a capacitive type.

FIG. 18 is a cross-sectional structural view of the display unit 151, if the force sensor 1451 in accordance with one embodiment of the present invention is a capacitive type.

In general, the force sensor 1451 is a sensor to measure a magnitude of applied force. If such a force sensor 1451 is applied to the mobile terminal 100, force touch may be implemented. Force touch is a technology, in which not only 2D touch but also a level of force applied by touch may be sensed, and is referred to as 3D touch. The force sensor 1451 may be one of a capacitive type, a resistive type, an inductive type, a strain gauge type, etc., according to pressure sensing methods.

If the force sensor 1451 in accordance with tone embodiment of the present invention is a capacitive type, the force sensor 1451 includes two electrodes parallel to each other and a dielectric material interposed between the two electrodes, as exemplarily shown in FIG. 18. When current flows to the two electrodes, electric charges are accumulated, and a capacity for accumulating electric charges may be referred to as capacitance. Capacitance is directly proportional to areas of the two electrodes and a dielectric constant of the dielectric material and is inversely proportional to a distance between the two electrodes.

When pressure is applied to the force sensor 1451, a distance between the two electrodes is changed and thus capacitance is changed. Therefore, a magnitude of the pressure applied to the force sensor 1451 may be measured by calculating a change in capacitance.

The capacitive-type force sensor 1451 may further include adhesive tapes on the outer surfaces of the two electrodes. The adhesive tapes may be adhered to the thermal sheet 1519 and the rear case 102 after the force sensor 1451 is inserted into the interval.

The thickness of one electrode is about 0.05 mm, the thickness of one adhesive tape is about 0.05 mm, and the thickness of the dielectric material is about 0.15 mm. Since the two electrodes and the two adhesive tapes are provided, the overall thickness of the capacitive-type force sensor 1451 is about 0.35 mm. Such an overall thickness is similar to the length of above-described offset. Therefore, the capacitive-type force sensor 1451 may be inserted into the interval provided as the offset.

Figure 19:
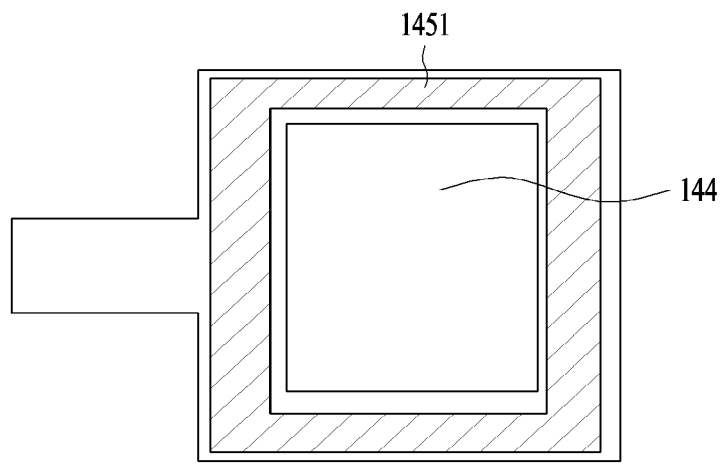
FIG. 19 is a conceptual view of the force sensor of FIG. 18, if the force sensor provides a single channel function.

FIG. 19 is a conceptual view of the force sensor 1451 of FIG. 18, if the force sensor 1451 provides a single channel function.

As described above, the force sensor 1451 has a ring shape provided with a hole formed through the center thereof and having a size or a shape corresponding to those of the fingerprint recognition sensor 144. Therefore, the fingerprint recognition sensor 144 is inserted into the central hole of the force sensor 1451 and the force sensor 1451 surrounds the side surface of the fingerprint recognition sensor 144. Here, as exemplarily shown in FIG. 19, the capacitive-type force sensor 1451 provides a single channel function and may thus continuously surround the side surface of the fingerprint recognition sensor 144 with one channel. However, in this case, the force sensor 1451 senses only a magnitude of pressure and, thus, even if a user applies pressure to a position deviating from the regular position of the fingerprint recognition sensor 144, the force sensor 1451 may not sense a deviating direction.

Figure 20:
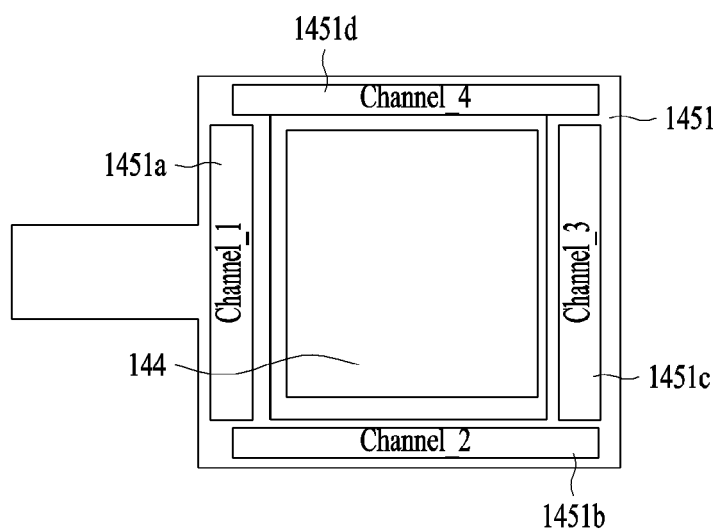
FIG. 20 is a conceptual view of the force sensor of FIG. 18, if the force sensor provides a multi-channel function.

FIG. 20 is a conceptual view of the force sensor 1451 of FIG. 18, if the force sensor 1451 provides a multi-channel function.

The capacitive-type force sensor 1451 may be a multi-channel functional force sensor 1451 which surrounds edges of the side surface of the fingerprint recognition sensor 144 with a plurality of channels. For example, as exemplarily shown in FIG. 20, if the fingerprint recognition sensor 144 has a rectangular shape, the force sensor 1451 may include a first channel 1451a extending in a direction of the left edge of the fingerprint recognition sensor 144, a second channel 1451b extending in a direction of the lower edge of the fingerprint recognition sensor 144, a third channel 1451c extending in a direction of the right edge of the fingerprint recognition sensor 144 and a fourth channel 1451d extending in a direction of the upper edge of the fingerprint recognition sensor 144. Therefore, the force sensor 1451 may surround the side surface of the fingerprint recognition sensor 144. The channels 1451a, 1451b, 1451c and 1451d may contact the neighboring channels, or may be spaced apart from the neighboring channels 1451a, 1451b, 1451c and 1451d, as exemplarily shown in FIG. 20. That is, when the force sensor 1451 surrounds the side surface of the fingerprint recognition sensor 144, the channels 1451a, 1451b, 1451c and 1451d of the force sensor 1451 may not form a continuously closed line.

Figure 21:
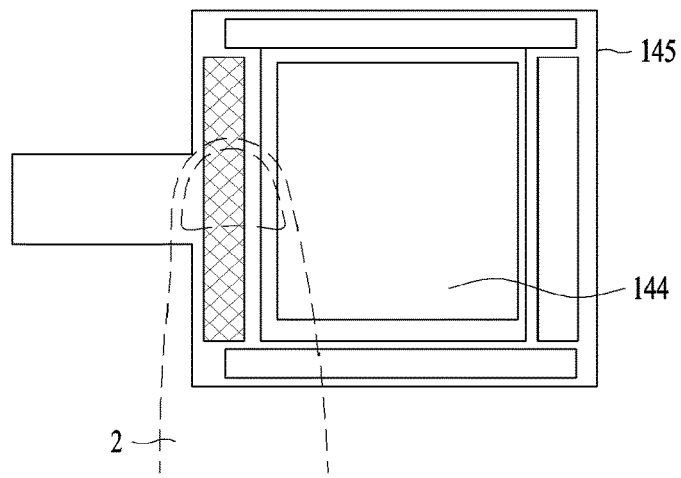
FIG. 21 is a conceptual view illustrating application of pressure to a first channel of FIG. 20.
Figure 22:
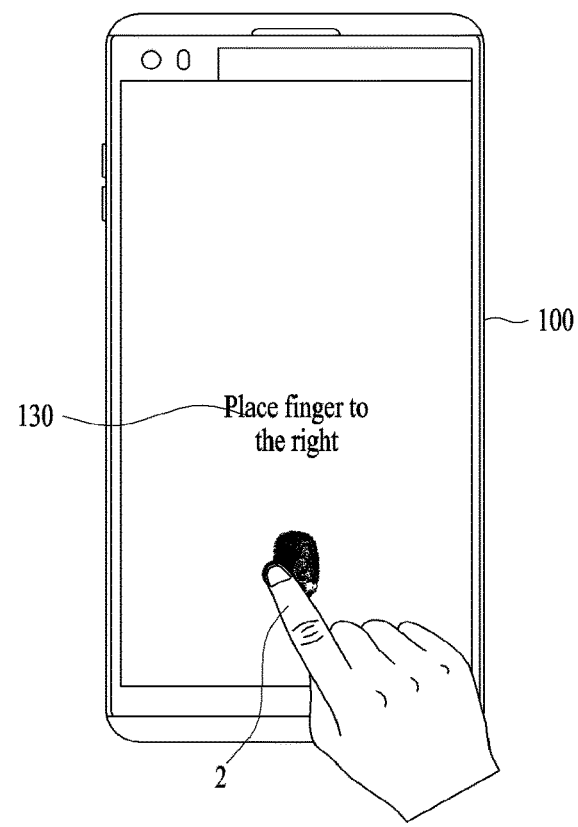
FIG. 22 is a view illustrating display of an indicator on the display unit, as a result of application of pressure in FIG. 21.

FIG. 21 is a conceptual view illustrating application of pressure to the first channel 1451a of FIG. 20, and FIG. 22 is a view illustrating display of an indicator 130 on the display unit 141, as a result of application of pressure in FIG. 21.

The capacitive-type force sensor 1451 providing such a multi-channel function may measure not only a magnitude of applied pressure but also a direction of the applied pressure. Therefore, even if a user applies pressure to a position deviating from the regular position of the fingerprint recognition sensor 144, the force sensor 1451 may sense a deviating direction. For example, as exemplarily shown in FIG. 21, the user may press a position deviating leftward from the regular position of the fingerprint recognition sensor 144 with the finger 2. In this case, a magnitude of pressure applied to the first channel 1451a is greater than a magnitude of pressure applied to the second, third and fourth channels 1451b, 1451c and 1451d. Further, the fingerprint recognition sensor 144 may not smoothly recognize a fingerprint.

If the force sensor 1451 senses that the magnitude of pressure applied to the first channel 1451a is greater than the magnitude of pressure applied to the second, third and fourth channels 1451b, 1451c and 1451d and exceeds a predetermined error range and the fingerprint recognition sensor 144 may not smoothly recognize the fingerprint, the controller 180 of the mobile terminal 100 may determine that the user finger 2 deviates leftward from the regular position of the fingerprint recognition sensor 144. Here, the predetermined error range is a criterion for determining deviation of the user finger 2 from the regular position of the fingerprint recognition sensor 144 and may be experimentally determined in consideration of various conditions, such as sensitivity of the fingerprint recognition sensor 144, etc. Hereinafter, other embodiments are the same as above. The controller 180, as exemplarily shown in FIG. 22, may display the indicator 130 instructing the user to place the finger 2 to the right through the display unit 151.

Figure 23:
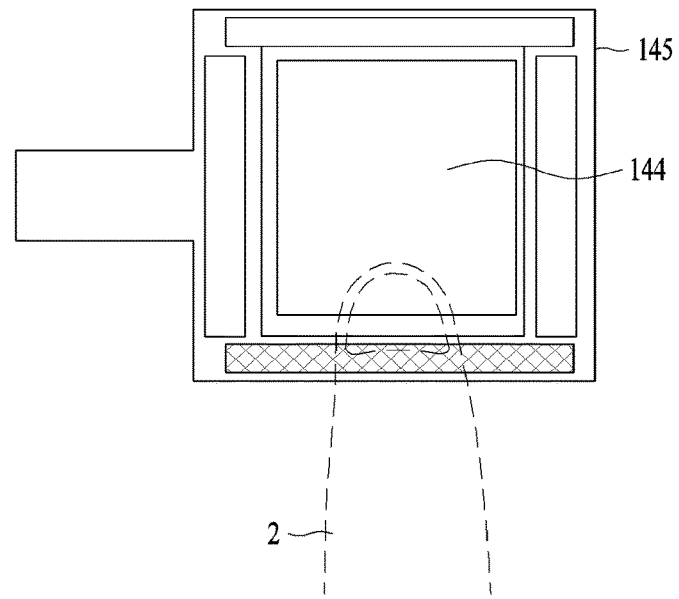
FIG. 23 is a conceptual view illustrating application of pressure to a second channel of FIG. 20.
Figure 24:
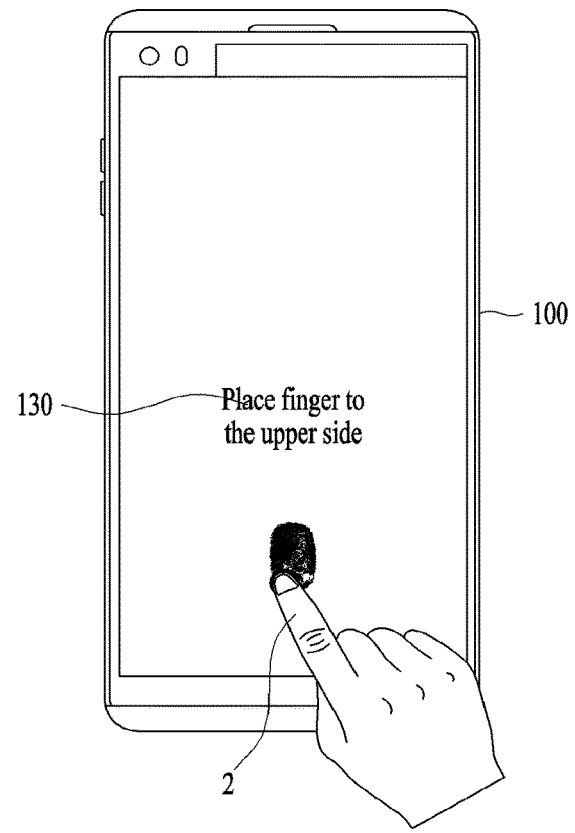
FIG. 24 is a view illustrating display of the indicator on the display unit, as a result of application of pressure in FIG. 23.

FIG. 23 is a conceptual view illustrating application of pressure to the second channel 1451b of FIG. 20, and FIG. 24 is a view illustrating display of the indicator 130 on the display unit 151, as a result of application of pressure in FIG. 23.

For example, as exemplarily shown in FIG. 23, the user may press a position deviating downward from the regular position of the fingerprint recognition sensor 144 with the finger 2. In this case, a magnitude of pressure applied to the second channel 1451b is greater than a magnitude of pressure applied to the first, third and fourth channels 1451a, 1451c and 1451d. Further, the fingerprint recognition sensor 144 may not smoothly recognize a fingerprint.

If the force sensor 1451 senses that the magnitude of pressure applied to the second channel 1451b is greater than the magnitude of pressure applied to the first, third and fourth channels 1451a, 1451c and 1451d and exceeds the predetermined error range and the fingerprint recognition sensor 144 may not smoothly recognize the fingerprint, the controller 180 of the mobile terminal 100 may determine that the user finger 2 deviates downward from the regular position of the fingerprint recognition sensor 144. Further, the controller 180, as exemplarily shown in FIG. 24, may display the indicator 130 instructing the user to place the finger 2 to the upper side through the display unit 151.

Figure 25:
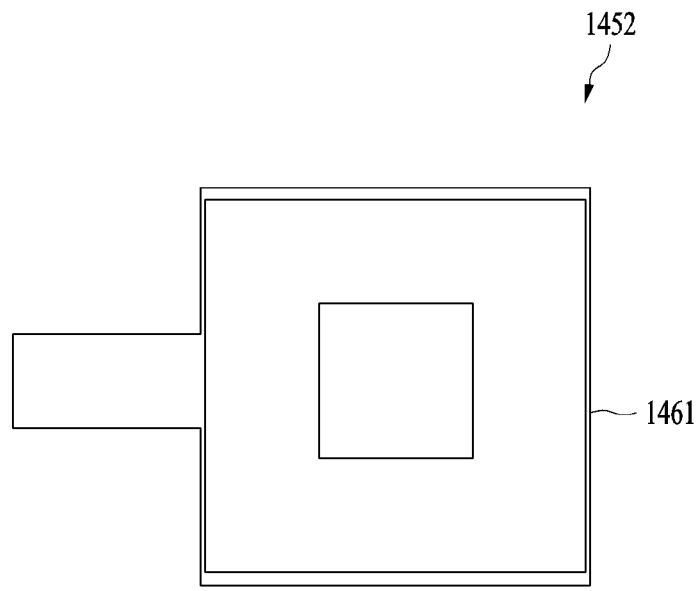
FIG. 25 is a cross-sectional structural view of the display unit, if the force sensor in accordance with one embodiment of the present invention is a resistive type.
Figure 25:
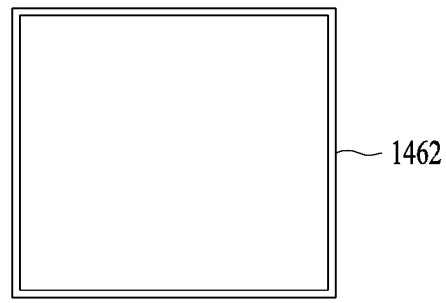
Figure 25:
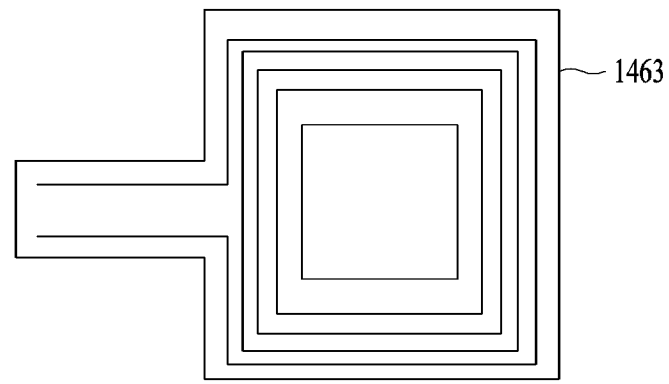
Figure 26:
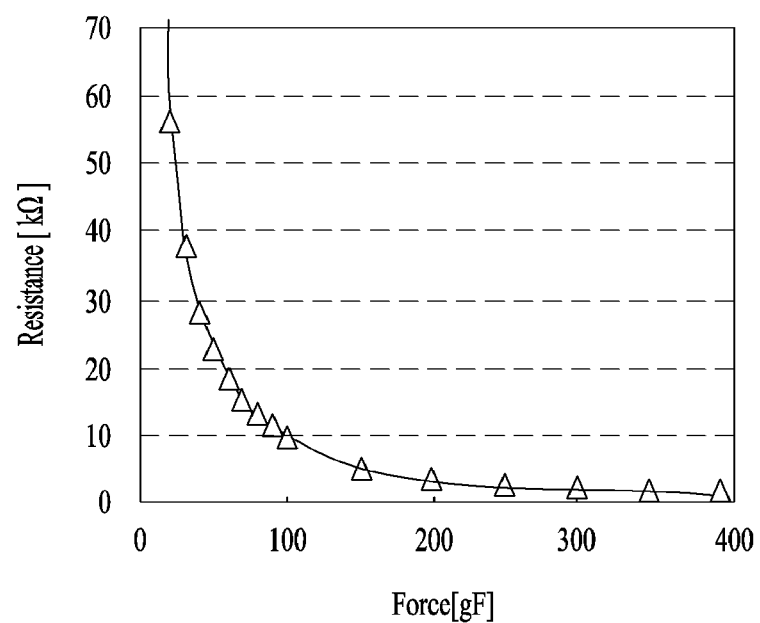
FIG. 26 is a graph representing relations between magnitudes of pressure applied to the force sensor of FIG. 25 and magnitudes of resistance thereby.

FIG. 25 is a cross-sectional structural view of the display unit 151, if the force sensor 1452 in accordance with one embodiment of the present invention is a resistive type, and FIG. 26 is a graph representing relations between magnitudes of pressure applied to the force sensor 1452 of FIG. 25 and magnitudes of resistance thereby.

If the force sensor 1452 in accordance with one embodiment of the present invention is a resistive type, the force sensor 1452 includes two PET films 1461 and 1463 and an adhesive part 1462, as exemplarily shown in FIG. 25. A force-sensitive resistive (FSR) ink is applied to the first PET film 1461, and a silver ink pattern is printed on the second PET film 1463. Further, the adhesive part 1462 is disposed between the first and second PET films 1461 and 1463 and thus adheres the first and second PET films 1461 and 1463 to each other while maintaining a designated interval therebetween.

A resistance value is varied according to a magnitude of pressure applied to the resistive-type force sensor 1452. In more detail, the silver ink pattern serves as a variable resistor and, when pressure is applied to the resistive-type force sensor 1452, a cross-sectional area of the silver ink pattern, in which current flows, is changed by the FSR ink. As exemplarily shown in FIG. 26, a magnitude of pressure is inversely proportional to a resistance value and, thus, as pressure is increased, resistance is decreased. When a designated voltage is applied to the force sensor 1452, resistance and current are inversely proportional to each other and, thus, a magnitude of pressure is approximately directly proportional to current. Therefore, a magnitude of pressure applied to the force sensor 1452 may be measured from a current value output from the force sensor 1452.

Figure 27:
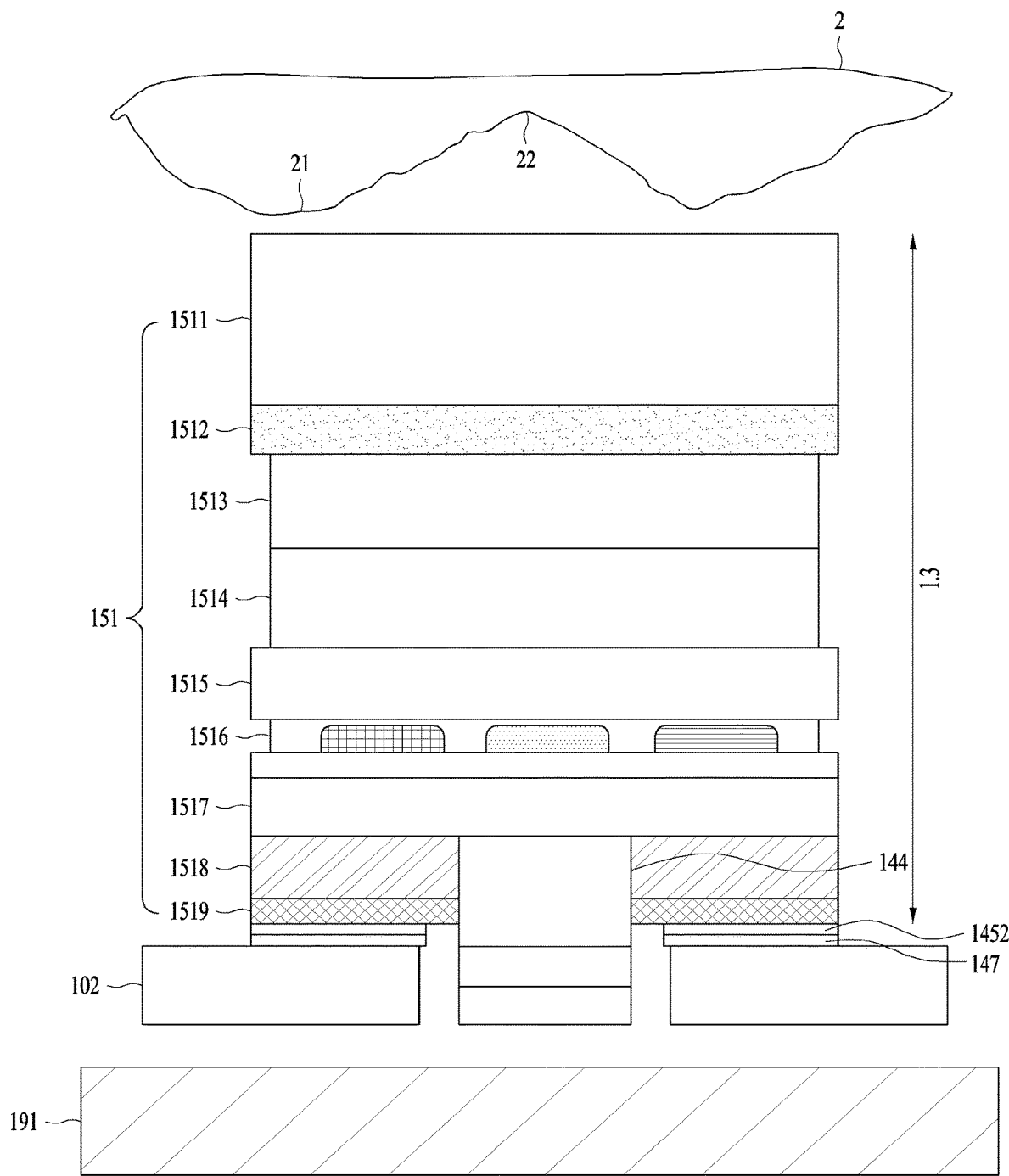
FIG. 27 is a cross-sectional structural view of the display unit in which a cushion member is disposed under the force sensor of FIG. 25.

FIG. 27 is a cross-sectional structural view of the display unit 151 in which a cushion member 147 is disposed under the force sensor 1452 of FIG. 25.

The thickness of one PET film 1461 or 1463 is about 0.075 mm, and the thickness of the adhesive part 1462 is about 0.015 mm. Since the two PET films 1461 and 1463 are provided, the overall thickness of the resistive-type force sensor 1452 is about 0.165 mm. However, since the length of the above-described offset is about 0.35 mm, the thickness of the force sensor 1452 is smaller than the length of the offset. In this case, if the resistive-type force sensor 1452 is inserted into the interval provided as the offset, when pressure is applied to the resistive-type force sensor 1452, normal force does not occur as a reaction against pressure. Therefore, the cross-sectional area of the silver ink pattern is not changed and, thus, change in resistance may not be measured. The resistive-type force sensor 1452 may further include the cushion member 147 filling the interval provided as the offset and thus generating normal force, and an adhesive tape to adhere the cushion member 147 to the force sensor 1452.

Since the thickness of the adhesive tape is about 0.025 mm, if the cushion member 147 has a thickness of about 0.16 mm, the total thickness of the force sensor 1452 including the cushion member 147 is about 0.35 mm. Therefore, the force sensor 1452 including the cushion member 147 may be inserted into such an interval provided as the offset.

Here, as exemplarily shown in FIG. 27, the cushion member 147 may be disposed under the force sensor 1452. In this case, the adhesive tape may be provided on the lower surface of the force sensor 1452 and thus adhere the cushion member 147 to the force sensor 1452. However, the disclosure is not limited thereto and the cushion member 147 may be disposed on the force sensor 1452. In this case, the adhesive tape may be provided on the upper surface of the force sensor 1452 and thus adhere the cushion member 147 to the force sensor 1452. In order to cushion impact applied to the force sensor 1452, the cushion member 147 may be formed of an elastic material, such as rubber or urethane.

Figure 28:
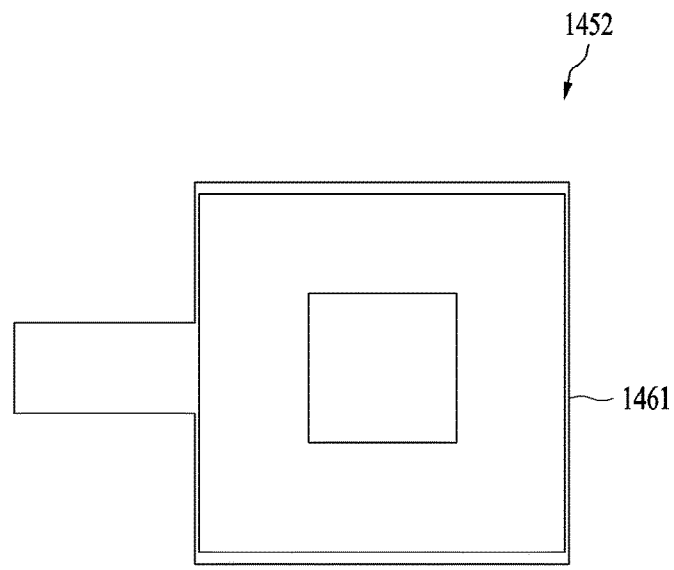
FIG. 28 is a structural view of the force sensor of FIG. 25, if the force sensor provides a multi-channel function.
Figure 28:
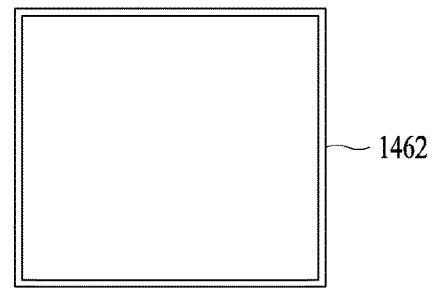
Figure 28:
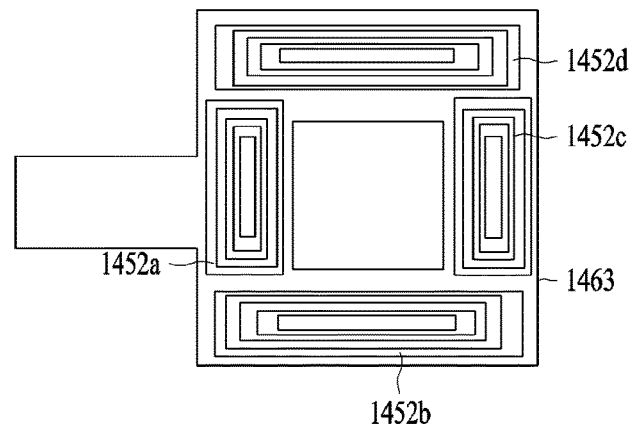

FIG. 28 is a structural view of the force sensor 1452 of FIG. 25, if the force sensor 1452 provides a multi-channel function.

As exemplarily shown in FIG. 25, the resistive-type force sensor 1452 provides a single channel function and may thus continuously surround the side surface of the fingerprint recognition sensor 144 with one channel. However, in this case, the force sensor 1452 senses only a magnitude of pressure and, thus, even if a user applies pressure to a position deviating from the regular position of the fingerprint recognition sensor 144, the force sensor 1452 may not sense a deviating direction.

Therefore, the resistive-type force sensor 1452 may be operated as a multi-channel functional force sensor 1452 which surrounds the side surface of the fingerprint recognition sensor 144 with a plurality of channels such that one channel surrounds one of edges of the side surface of the fingerprint recognition sensor 144. For example, as exemplarily shown in FIG. 28, if the fingerprint recognition sensor 144 has a rectangular shape, the force sensor 1452 may include a first channel 1452*a* extending in a direction of the left edge of the fingerprint recognition sensor 144, a second channel 1452*b* extending in a direction of the lower edge of the fingerprint recognition sensor 144, a third channel 1452*c* extending in a direction of the right edge of the fingerprint recognition sensor 144 and a fourth channel 1452*d* extending in a direction of the upper edge of the fingerprint recognition sensor 144. Therefore, the force sensor 1452 may surround the side surface of the fingerprint recognition sensor 144. The channels 1452*a*, 1452*b*, 1452*c* and 1452*d* may be spaced apart from the neighboring channels 1452*a*, 1452*b*, 1452*c* and 1452*d*, as exemplarily shown in FIG. 28. That is, when the force sensor 1452 surrounds the side surface of the fingerprint recognition sensor 144, the channels 1452*a*, 1452*b*, 1452*c* and 1452*d* of the force sensor 1452 may not form a continuously closed line.

The above description with reference to FIGS. 21 to 24 may be applied not only to the capacitive-type force sensor 1451 but also to the resistive-type force sensor 1452.

Specifically, the resistive-type force sensor 1452 providing such a multi-channel function may measure not only a magnitude of applied pressure but also a direction of the applied pressure. For example, as exemplarily shown in FIG. 21, the user may press a position deviating leftward from the regular position of the fingerprint recognition sensor 144 with the finger 2. In this case, a magnitude of pressure applied to the first channel 1452*a* is greater than a magnitude of pressure applied to the second, third and fourth channels 1452*b*, 1452*c* and 1452*d*. Further, the fingerprint recognition sensor 144 may not smoothly recognize a fingerprint.

If the force sensor 1452 senses that the magnitude of pressure applied to the first channel 1452*a* is greater than the magnitude of pressure applied to the second, third and fourth channels 1452*b*, 1452*c* and 1452*d* and exceeds a predetermined error range and the fingerprint recognition sensor 144 may not smoothly recognize the fingerprint, the controller 180 of the mobile terminal 100 may determine that the user finger 2 deviates leftward from the regular position of the fingerprint recognition sensor 144. Further, the controller 180, as exemplarily shown in FIG. 22, may display the indicator 130 instructing the user to place the finger 2 to the right through the display unit 151.

For example, as exemplarily shown in FIG. 23, the user may press a position deviating downward from the regular position of the fingerprint recognition sensor 144 with the finger 2. In this case, a magnitude of pressure applied to the second channel 1452*b* is greater than a magnitude of pressure applied to the first, third and fourth channels 1452*a*, 1452*c* and 1452*d*. Further, the fingerprint recognition sensor 144 may not smoothly recognize a fingerprint.

If the force sensor 1452 senses that the magnitude of pressure applied to the second channel 1452*b* is greater than the magnitude of pressure applied to the first, third and fourth channels 1452*a*, 1452*c* and 1452*d* and exceeds the predetermined error range and the fingerprint recognition sensor 144 may not smoothly recognize the fingerprint, the controller 180 of the mobile terminal 100 may determine that the user finger 2 deviates downward from the regular position of the fingerprint recognition sensor 144. Further, the controller 180, as exemplarily shown in FIG. 24, may display the indicator 130 instructing the user to place the finger 2 to the upper side through the display unit 151.

Figure 29:
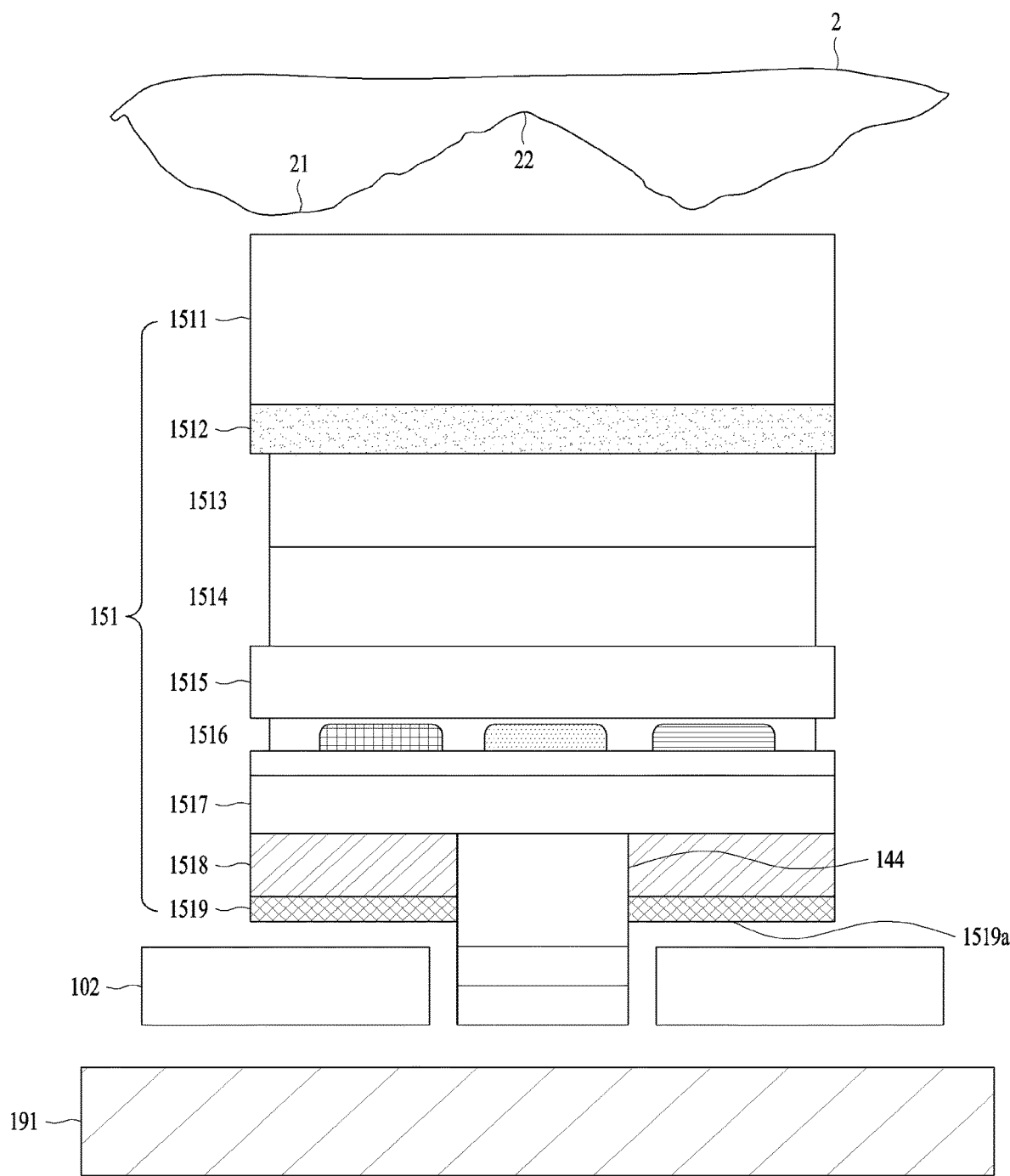
FIG. 29 is a cross-sectional structural view of the display unit, if the force sensor in accordance with one embodiment of the present invention is an inductive type.
Figure 30:
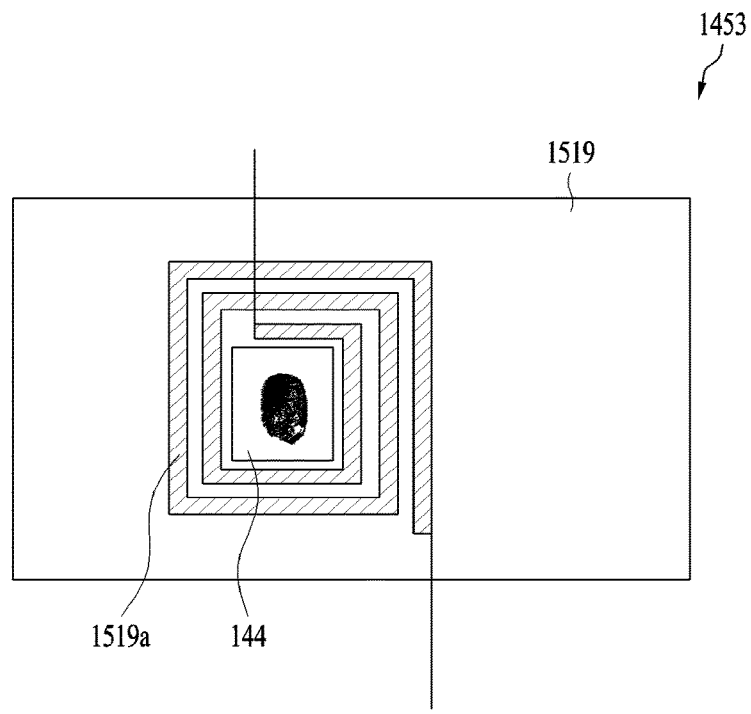
FIG. 30 is a conceptual view illustrating a coil patterned on a thermal sheet of FIG. 29.

FIG. 29 is a cross-sectional structural view of the display unit 151, if the force sensor 1453 in accordance with one embodiment of the present invention is an inductive type, and FIG. 30 is a conceptual view illustrating a coil 1519*a* patterned on the thermal sheet 1519 of FIG. 29.

If the force sensor 1453 in accordance with one embodiment of the present invention is an inductive type, the display unit 151 includes the coil 1519a through which current flows, and a conductor in which eddy current by the coil 1519a flows, as exemplarily shown in FIG. 29. The coil 1519a is not provided by insertion but may be formed on the existing thermal sheet 1519 by patterning, as exemplarily shown in FIG. 30. For this purpose, the thermal sheet 1519 may be formed of a metal having high electrical conductivity. Further, the existing rear case 102 serves as the conductor. However, the disclosure is not limited thereto and the coil 1519a or the conductor may be separately provided. However, if the coil 1519a or the conductor may be separately provided, the coil 1519a or the conductor does not have a sufficient thickness to fill the entirety of the interval provided as the offset. The reason for this is that a distance between the coil 1519a and the conductor is changed according to a magnitude of pressure, which will be described later.

Figure 31:
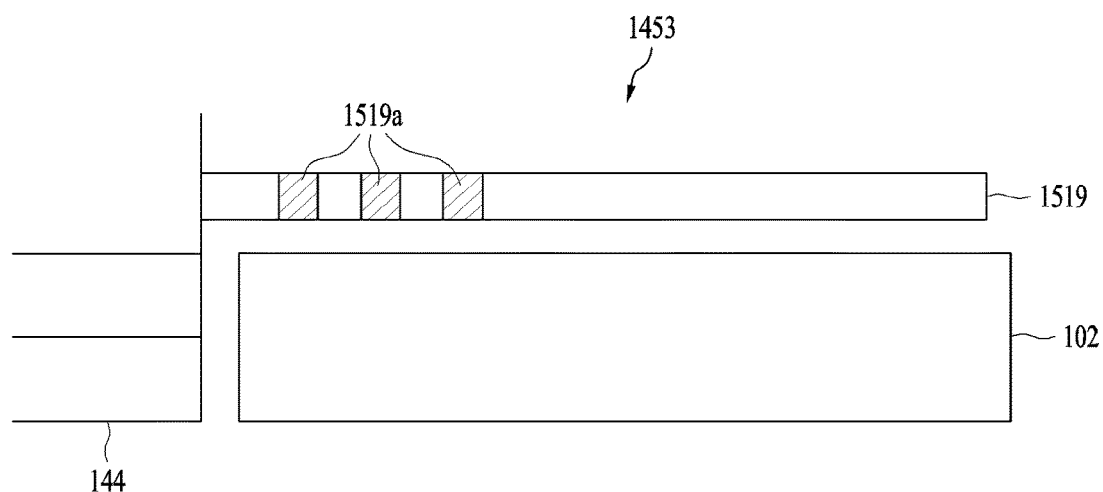
FIG. 31 is a conceptual view illustrating operation of the force sensor of FIG. 29.

FIG. 31 is a conceptual view illustrating operation of the force sensor 1453 of FIG. 29.

According to Ampere's right handed screw rule, when current flows in a wire, a magnetic field is generated around the wire in the direction of a right handed screw. The coil 1519a shown in FIG. 30 is a shape formed by bending such a wire, and a magnetic field is generated around and inside the coil 1519a.

As exemplarily shown in FIGS. 29 and 31, the rear case 102 serving as the conductor is disposed below the coil 1519a in which current flows. When a user applies pressure with a finger 2, a distance between the coil 1519a and the rear case 102 is decreased. Then, a magnitude of the magnetic field generated around the coil 1519a in the rear case 102 is increased. When the magnitude of the magnetic field is changed, an induced current is generated in a direction of disturbing change in the magnetic field according to Lenz's law. The magnetic field generated around and inside of the coil 1519a flows in a direction approximately perpendicular to the upper surface of the rear case 102. Therefore, the induced current becomes eddy current swirling within the rear case 102. That is, a magnitude of pressure may be measured through an intensity of eddy current changed as the coil 1519a becomes close to the conductor when pressure is applied.

Figure 32:
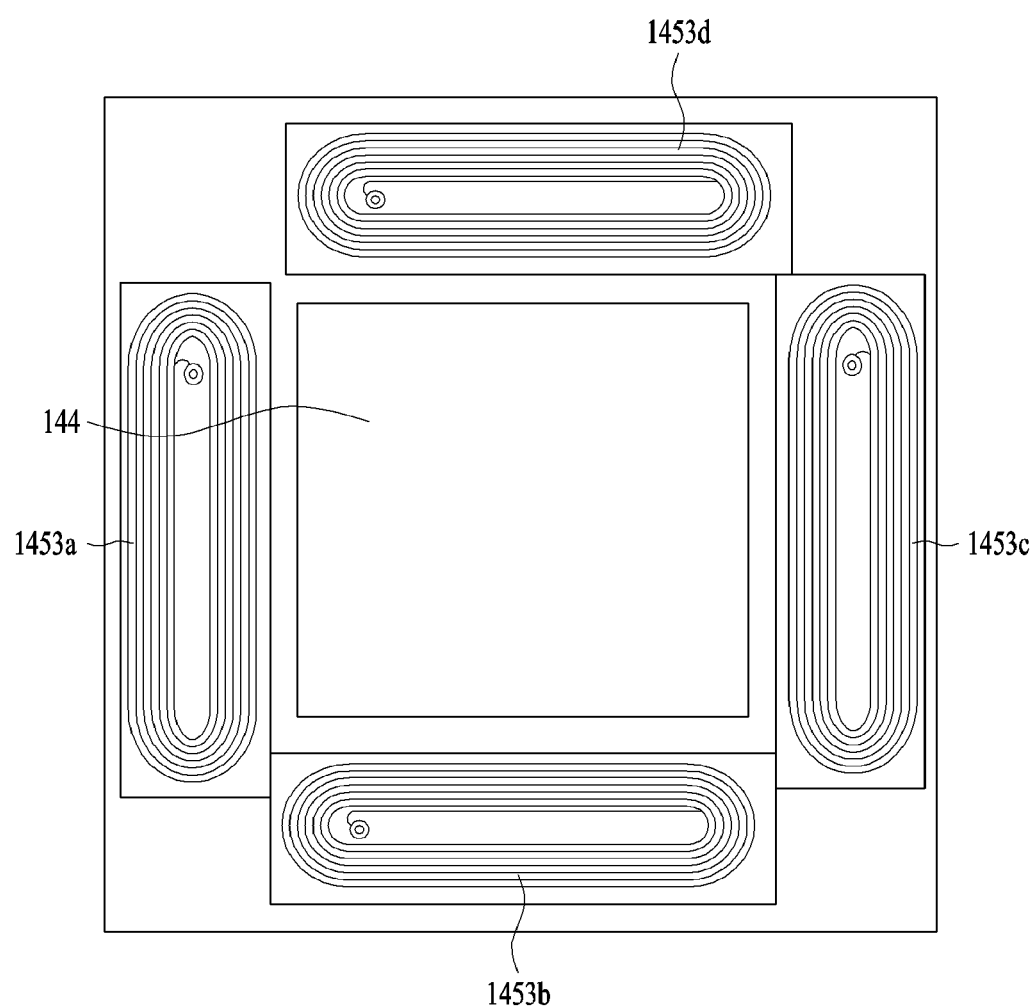
FIG. 32 is a conceptual view of the force sensor of FIG. 29, if the force sensor provides a multi-channel function.

FIG. 32 is a conceptual view of the force sensor 1453 of FIG. 29, if the force sensor 1453 provides a multi-channel function.

As exemplarily shown in FIG. 20, the coil 1519a provides a single channel function and may thus continuously surround the side surface of the fingerprint recognition sensor 144 with one channel. However, in this case, the force sensor 1453 senses only a magnitude of pressure and, thus, even if a user applies pressure to a position deviating from the regular position of the fingerprint recognition sensor 144, the force sensor 1453 may not sense a deviating direction.

Therefore, the inductive-type force sensor 1453 may be implemented as a multi-channel functional force sensor 1453 which surrounds the side surface of the fingerprint recognition sensor 144 with a plurality of channels such that one channel surrounds one of edges of the side surface of the fingerprint recognition sensor 144. For example, as exemplarily shown in FIG. 32, if the fingerprint recognition sensor 144 has a rectangular shape, the force sensor 1453 may include a first channel 1453a extending in a direction of the left edge of the fingerprint recognition sensor 144, a second channel 1453b extending in a direction of the lower edge of the fingerprint recognition sensor 144, a third channel 1453c extending in a direction of the right edge of the fingerprint recognition sensor 144 and a fourth channel 1453d extending in a direction of the upper edge of the fingerprint recognition sensor 144. Therefore, the force sensor 1455 may surround the side surface of the fingerprint recognition sensor 144. The channels 1453a, 1453b, 1453c and 1453d may be spaced apart from the neighboring channels 1453a, 1453b, 1453c and 1453d, as exemplarily shown in FIG. 32. That is, when the force sensor 1453 surrounds the side surface of the fingerprint recognition sensor 144, the channels 1453a, 1453b, 1453c and 1453d of the force sensor 1453 may not form a continuously closed line.

The above description with reference to FIGS. 21 to 24 may be applied not only to the capacitive-type force sensor 1451 but also to the inductive-type force sensor 1453.

Specifically, the inductive-type force sensor 1453 providing such a multi-channel function may measure not only a magnitude of applied pressure but also a direction of the applied pressure. For example, as exemplarily shown in FIG. 21, the user may press a position deviating leftward from the regular position of the fingerprint recognition sensor 144 with the finger 2. In this case, a magnitude of pressure applied to the first channel 1453a is greater than a magnitude of pressure applied to the second, third and fourth channels 1453b, 1453c and 1453d. Further, the fingerprint recognition sensor 144 may not smoothly recognize a fingerprint.

If the force sensor 1453 senses that the magnitude of pressure applied to the first channel 1453a is greater than the magnitude of pressure applied to the second, third and fourth channels 1453b, 1453c and 1453d and exceeds a predetermined error range and the fingerprint recognition sensor 144 may not smoothly recognize the fingerprint, the controller 180 of the mobile terminal 100 may determine that the user finger 2 deviates leftward from the regular position of the fingerprint recognition sensor 144. Further, the controller 180, as exemplarily shown in FIG. 22, may display the indicator 130 instructing the user to place the finger 2 to the right through the display unit 151.

For example, as exemplarily shown in FIG. 23, the user may press a position deviating downward from the regular position of the fingerprint recognition sensor 144 with the finger 2. In this case, a magnitude of pressure applied to the second channel 1453b is greater than a magnitude of pressure applied to the first, third and fourth channels 1453a, 1453c and 1453d. Further, the fingerprint recognition sensor 144 may not smoothly recognize a fingerprint.

If the force sensor 1453 senses that the magnitude of pressure applied to the second channel 1453b is greater than the magnitude of pressure applied to the first, third and fourth channels 1453a, 1453c and 1453d and exceeds the predetermined error range and the fingerprint recognition sensor 144 may not smoothly recognize the fingerprint, the controller 180 of the mobile terminal 100 may determine that the user finger 2 deviates downward from the regular position of the fingerprint recognition sensor 144. Further, the controller 180, as exemplarily shown in FIG. 24, may display the indicator 130 instructing the user to place the finger 2 to the upper side through the display unit 151.

So far, the display unit 151 including the force sensor 145 in accordance with one embodiment of the present invention has been described. The force sensor 145 in accordance with one embodiment of the present invention is disposed so as to surround the side surface of the fingerprint recognition sensor 144. Further, the force sensor 145 is inserted into the interval provided as an offset between the display unit 151 and the rear case 102. Therefore, the thickness of the fingerprint recognition sensor 144 is not increased and, thus, formation of a stepped portion caused by protruding of the fingerprint recognition sensor 14 from of the rear case 102 may be prevented. However, if the force sensor 145 has a large thickness to some degree, the force sensor 145 may be disposed so as to surround the side surface of the fingerprint recognition sensor 144. If the force sensor 145 has a very small thickness, it is unnecessary to dispose the force sensor 145 so as to surround the side surface of the fingerprint recognition sensor 144. Hereinafter, a case that the force sensor 145 has a very small thickness will be described.

Figure 33:
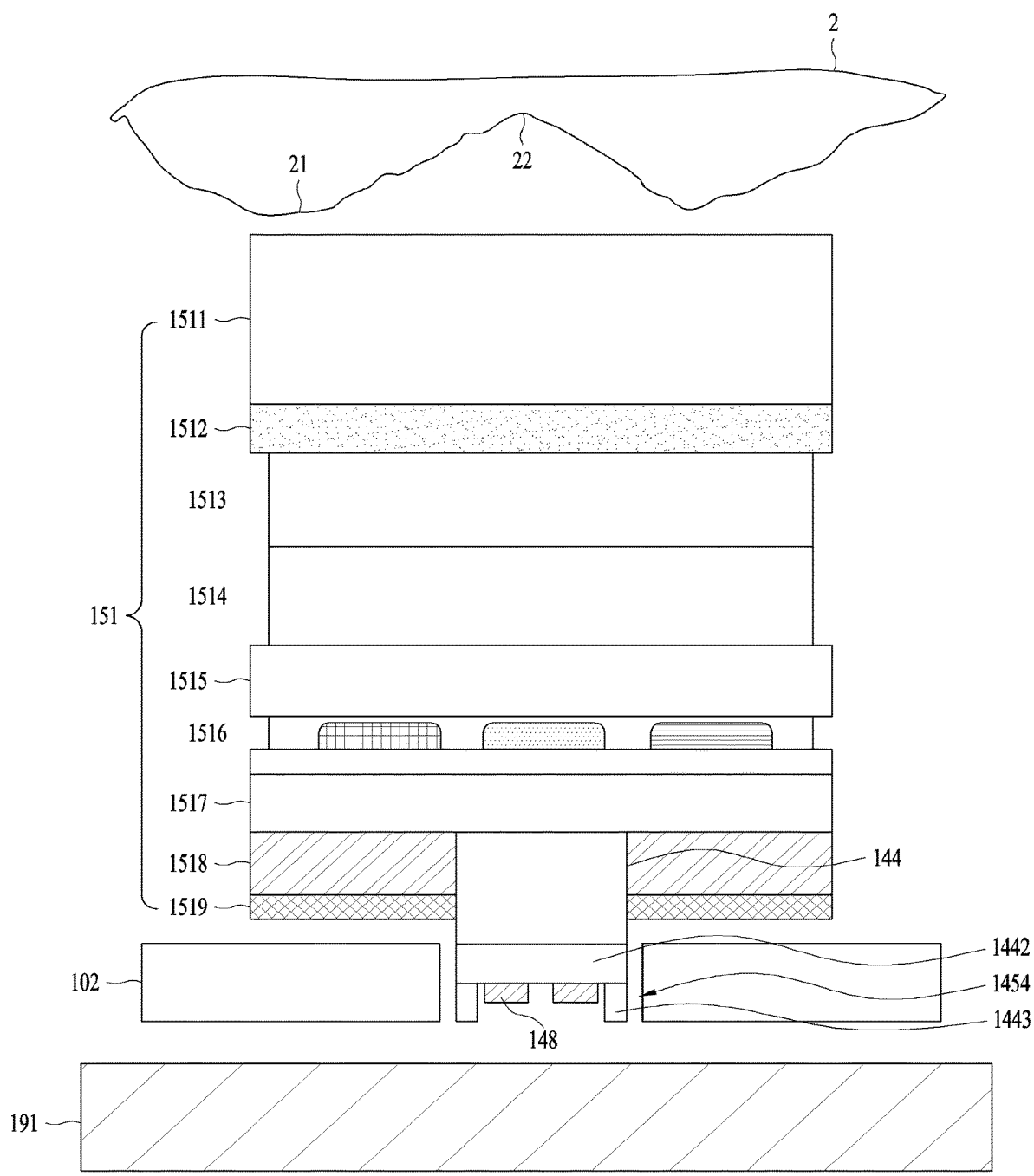
FIG. 33 is a cross-sectional structural view of a display unit including a force sensor in accordance with another embodiment of the present invention.
Figure 34:
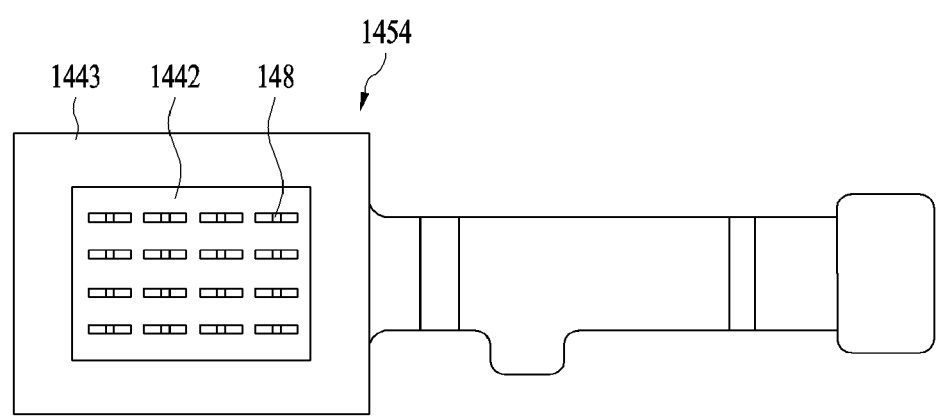
FIG. 34 is a front view of the force sensor of FIG. 33, if the force sensor is a strain gauge type.

FIG. 33 is a cross-sectional structural view of a display unit including a force sensor 1454 in accordance with another embodiment of the present invention, and FIG. 34 is a front view of the force sensor 1454 of FIG. 33, if the force sensor 1454 is a strain gauge type.

The force sensor 1454 in accordance with another embodiment of the present invention is a strain gauge type and thus has a very small thickness. Therefore, as exemplarily shown in FIG. 33, strain gauges 148 are directly attached to the lower surface of the fingerprint recognition sensor 144. In this case, the fingerprint recognition sensor 144 does not protrude from the rear case 102 and, thus, the thickness of the mobile terminal 100 is not increased.

Specifically, in accordance with one embodiment of the present invention, upper and lower surfaces of the light receiver 1441, the FPCB 1442 and the stiffener 1443 of the fingerprint recognition sensor 144 have similar shapes and areas. However, in accordance with another embodiment of the present invention, a stiffener 1443 of the fingerprint recognition sensor 144 has a designated width and is formed along edges of an FPCB 1442, as exemplarily shown in FIG. 34. That is, the stiffener 1443 has a ring shape provided with a hole formed through the center thereof. The width of the stiffener 1443 may be uniform or be varied according to edges of the FPCB 1442. Further, the stiffener 1443 may be formed through various methods, i.e., no stiffener 1443 may be formed around some edges of the FPCB 1442 or the stiffener 1443 may be formed only around both opposite edges of the FPCB 1442.

The stiffener 1443 is not formed in some regions of the lower surface of the fingerprint recognition sensor 144 and, thus, some regions of the lower surface of the FPCB 1442 may be exposed to the outside. Therefore, as exemplarily shown in FIG. 34, a plurality of strain gauges 148 is provided on the exposed surface of the FPCB 1442. The strain gauges 148 may be combined with the surface of the FPCB 1552 through a printing method. The strain gauges 148 combined with the surface of the FPCB 1552 through the printing method have a very small thickness of about 0.03 mm and thus do not protrude outward from the stiffener 1443 and do not increase the overall thickness of the fingerprint recognition sensor 144. The strain gauges 148 formed through the printing method may include a piezoresistive ink.

With reference to FIG. 33, the strain gauges 148 may be provided on the lower surface of the FPCB 1442 and the fingerprint recognition sensor 144 may be combined with the upper surface of the FPCB 1442. The fingerprint recognition sensor 144 may be combined with the FPCB 1442 through surface mount technology (SMT).

If the strain gauges 148 are located at positions vertically below the fingerprint recognition sensor 144, force transmitted to the fingerprint recognition sensor 144 is directly transmitted to the strain gauges 148 and thus the strain gauges 148 easily sense presence of minute force or change in such force.

Figure 35:
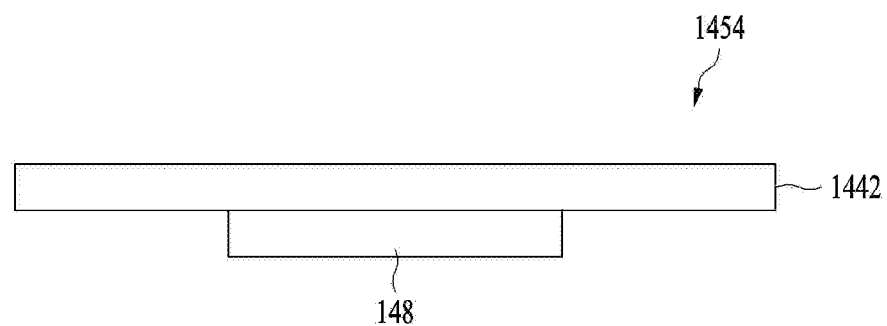
FIG. 35 is a conceptual view of the force sensor of FIG. 33, to which pressure is not applied.
Figure 36:
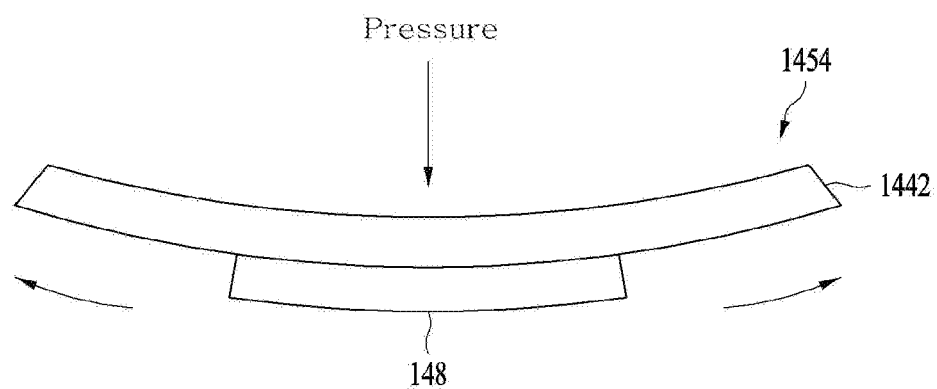
FIG. 36 is a conceptual view of the force sensor of FIG. 33, after pressure is applied thereto.

FIG. 35 is a conceptual view of the force sensor 1454 of FIG. 33, to which pressure is not applied, and FIG. 36 is a conceptual view of the force sensor 1454 of FIG. 33, after pressure is applied thereto.

When pressure is applied to the force sensor 1454, the length of the strain gauge 148 is changed and a magnitude of pressure is measured through change in a magnitude of inner resistance thereby. In accordance with another embodiment of the present invention, the strain gauges 148 are attached to the lower surface of the FPCB 1442 having flexibility, as exemplarily shown in FIG. 35. When pressure is applied to the force sensor 1454 in the downward direction from the top, the FPCB 1442 is bent downward, as exemplarily shown in FIG. 36. Here, the strain gauge 148 is also bent downward and the length of the strain gauge 148 is increased. Since a magnitude of resistance is directly proportional to a length, resistance of the strain gauge 148 is increased and a magnitude of pressure is measured through increase in resistance.

Figure 37:
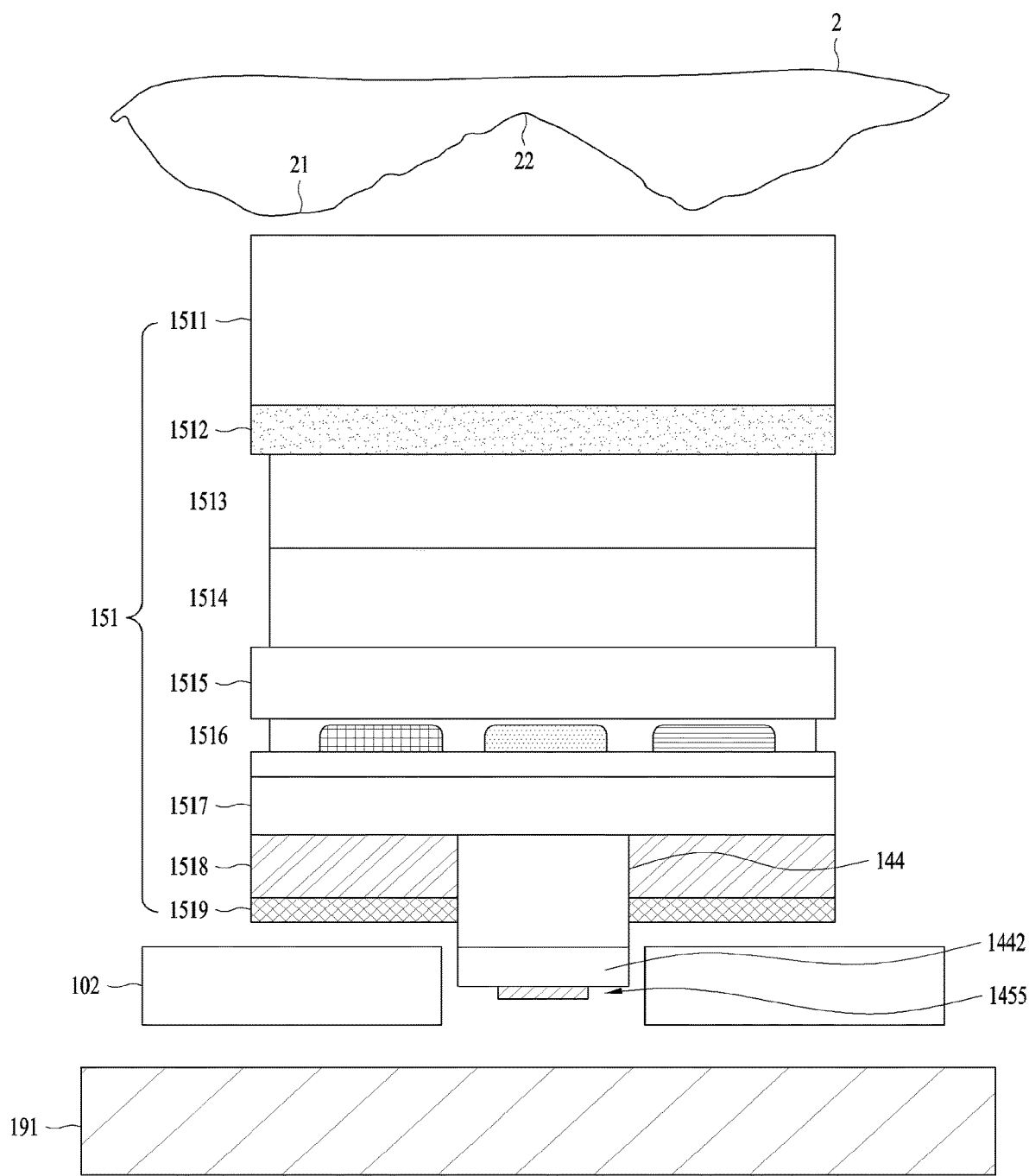
FIG. 37 is a cross-sectional structural view illustrating a display unit including a force sensor using strain gauges in accordance with another embodiment.

FIG. 37 is a cross-sectional structural view illustrating a display unit 151 including a force sensor 1455 using strain gauges 148 in accordance with another embodiment.

Figure 38:
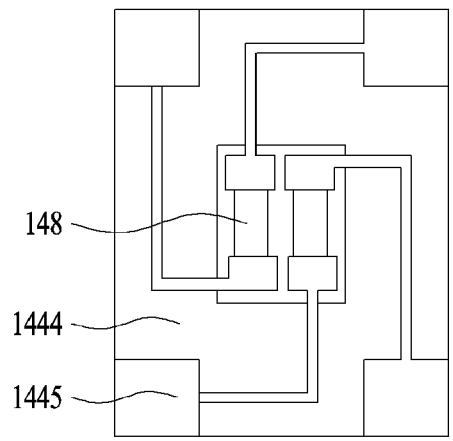
FIG. 38 includes front and rear views of the force sensor of FIG. 37.
Figure 38:
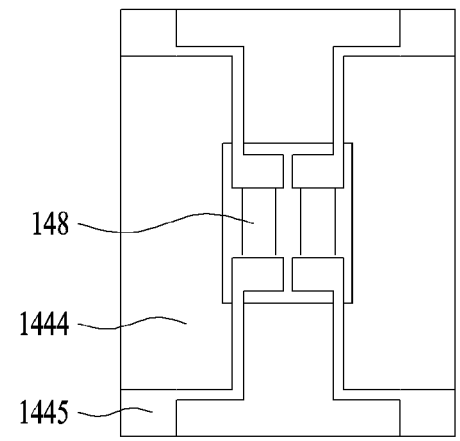

FIGS. 38(*a*) and 38(*b*) are front and rear views of the force sensor 1455 of FIG. 37. For convenience of description, FIGS. 37, 38(*a*) and 38(*b*) are simultaneously referred to.

The force sensor 1455 in this embodiment is the same as the force sensor 1454 in accordance with the earlier embodiment described with reference to FIGS. 33 and 34 in that the strain gauges 148 are located vertically below the fingerprint recognition sensor 144, and differs from the force sensor 1454 in that the single module-type force sensor 1455 is combined with the lower surface of the FPCB 1442 and no stiffener 1443 is provided.

FIG. 38(*a*) is a front view of the force sensor 1455 and FIG. 38(*b*) is a rear view of the force sensor 1455. The force sensor 1455 may include another FPCB 1444 provided separately from the FPCB 1442, and conductive patterns 1445 and the strain gauges 148 may be provided on both surfaces of the FPCB 1444. Advantages of the strain gauges 148 provided on both surfaces of the FPCB 1444 will be described later through the embodiment, which will be described below.

Figure 39:
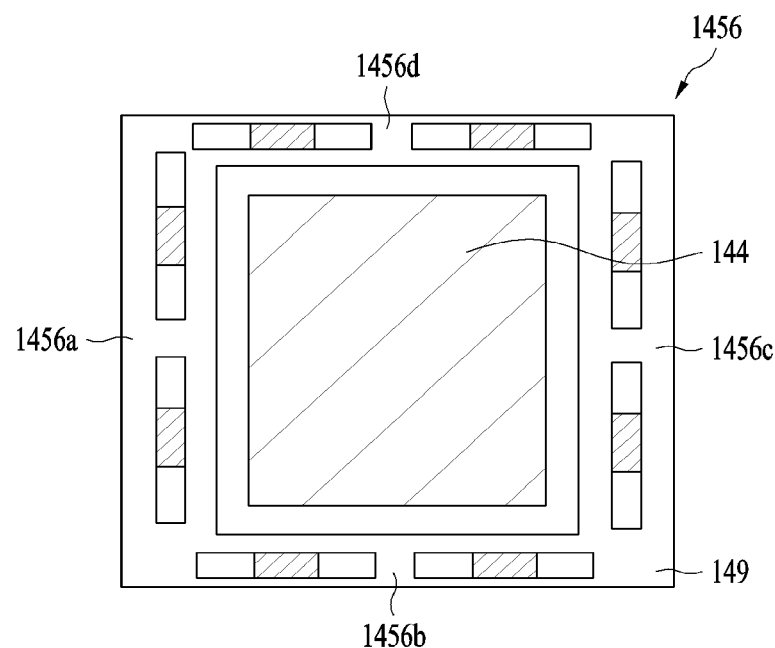
FIG. 39 is a front view of the force sensor providing a 4-channel function in accordance with one embodiment of the present invention, if the force sensor is a strain gauge type.

The conductive patterns 1445 provided on both surfaces of the FPCB 144 may be different. The reason for this is to minimize areas in which the conductive patterns 1445 provided on the respective surfaces of the FPCB 144 overlap each other and thus to minimize interference. FIG. 39 is a front view of a force sensor 1456 providing a 4-channel function in accordance with one embodiment of the present invention, if the force sensor 1456 is a strain gauge type.

The force sensor 1454 in the embodiment described with reference to FIGS. 33 and 34 is formed by attaching a plurality of strain gauges 148 to one surface of the FPCB 1442 of the fingerprint recognition sensor 144. In this case, the force sensor 1454 may estimate a position and a magnitude of pressure based on relative contraction or expansion degrees of the strain gauges 148 provided on one surface of the FPCB 1442. However, since a contraction or expansion degree difference may not be great, change in a resistance value is small and thus sensitivity may be lowered.

However, if a plurality of strain gauges 148 is provided on both surfaces of the FPCB 1442 (or the FPCB 1444 of FIGS. 37, 38(*a*) and 38(*b*)), when the strain gauges 148 on one surface of the FPCB 1444 are contracted, the strain gauges 148 on the other surface of the FPCB 144 are expanded and change in a resistance value is relatively increased. Consequently, sensitivity in measurement of a position and a magnitude of pressure is increased.

Therefore, in order to provide a multi-channel function, the strain gauge-type force sensor 1456 may be implemented as the force sensor shown in FIG. 16 in accordance with one embodiment of the present invention. That is, in order to surround the fingerprint recognition sensor 144 while having a designated width, the force sensor 1456 is provided with a hole formed through the center thereof and having a size or a shape corresponding to those of the fingerprint recognition sensor 144. Further, the force sensor 1456 is inserted into the interval provided as the offset while surrounding the side surface of the fingerprint recognition sensor 144. Here, the strain gauge-type force sensor 1456 is formed by attaching the strain gauges 148 to a PET film 149 having flexibility so as to surround the side surface of the fingerprint recognition sensor 144.

The force sensor 1456 may be implemented as a multi-channel functional force sensor 1456 which surrounds the side surface of the fingerprint recognition sensor 144 with a plurality of channels such that one channel surrounds one of edges of the side surface of the fingerprint recognition sensor 144. For example, as exemplarily shown in FIG. 39, if the fingerprint recognition sensor 144 has a rectangular shape, the force sensor 1456 may include a first channel 1456a extending in a direction of the left edge of the fingerprint recognition sensor 144, a second channel 1456b extending in a direction of the lower edge of the fingerprint recognition sensor 144, a third channel 1456c extending in a direction of the right edge of the fingerprint recognition sensor 144 and a fourth channel 1456d extending in a direction of the upper edge of the fingerprint recognition sensor 144. Therefore, the force sensor 1452 may surround the side surface of the fingerprint recognition sensor 144.

Figure 40:
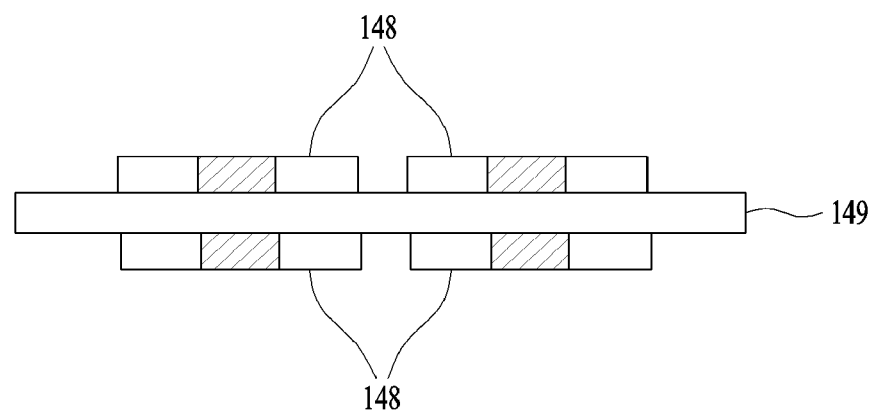
FIG. 40 is a conceptual view of the force sensor of FIG. 39, to which pressure is not applied.
Figure 41:
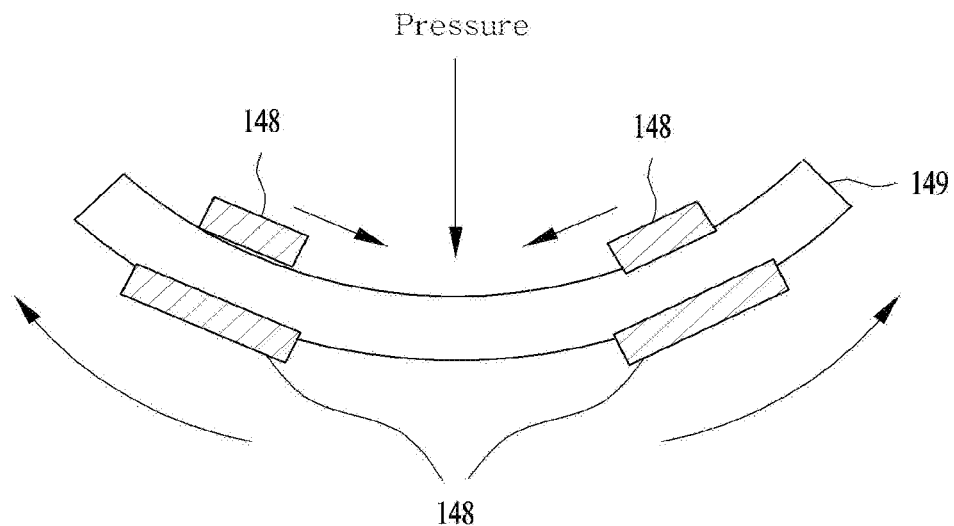
FIG. 41 is a conceptual view of the force sensor of FIG. 39, after pressure is applied thereto.

FIG. 40 is a conceptual view of the force sensor 1456 of FIG. 39, to which pressure is not applied, and FIG. 41 is a conceptual view of the force sensor 1456 of FIG. 39, after pressure is applied thereto.

In the strain gauge-type force sensor 1456 in accordance with one embodiment of the present invention, one channel may include a plurality of strain gauges 148. For example, as exemplarily shown in FIGS. 39 and 40, in one channel, two strain gauges 148 may be attached to the upper surface of the PET film 149 and two strain gauges 148 may be attached to the lower surface of the PET film 149 and, thus, one channel may include a total of four strain gauges 148. Here, as exemplarily shown in FIG. 40, the strain gauges 148 attached to the upper and lower surfaces of the PET film 149 may be attached to corresponding positions of the upper and lower surfaces of the PET film 149. The reason for this is that a magnitude of pressure may be more exactly measured by synthetically analyzing changes in lengths of the strain gauges 148 attached to the upper and lower surfaces of the PET film 149.

As exemplarily shown in FIG. 41, when pressure is applied to the force sensor 1456 in the downward direction from the top, the PET film 149 is bent downward. Here, the strain gauges 148 are also bent downward and, thus, the length of the strain gauges 148 attached to the upper surface of the PET film 149 is decreased and the length of the strain gauges 148 attached to the lower surface of the PET film 149 is increased. Since a magnitude of resistance is directly proportional to a length, resistance of the strain gauges 148 attached to the upper surface of the PET film 149 is decreased and resistance of the strain gauges 148 attached to the lower surface of the PET film 149 is increased.

Figure 42:
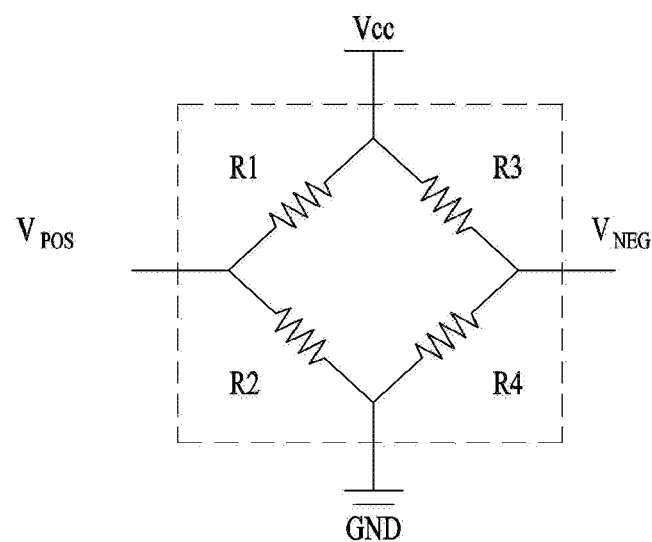
FIG. 42 is a circuit diagram in which 4 strain gauges included in one channel of FIG. 39 are connected by a Wheatstone bridge.

FIG. 42 is a circuit diagram in which 4 strain gauges 148 included in one channel of FIG. 39 are connected by a Wheatstone bridge.

Here, four strain gauges 148 forming one channel are connected so as to form a Wheatstone bridge. The Wheatstone bridge is a bridge circuit in which four resistors are connected to form a rectangular shape and the value of an unknown resistance may be measured through a potential difference. In this case, when pressure is applied to the force sensor 1456 from the top, resistances of first and fourth resistors R1 and R4 included in the two upper strain gauges 148 are decreased and resistances of second and third resistors R2 and R3 included in the two lower strain gauges 148 are increased. If the resistors included in two strain gauges 148 in the same direction are connected so as to be adjacent to each other, a potential difference does not occur even if pressure is applied. Therefore, the resistors included in two strain gauges 148 in the same direction must be connected so as to be opposite each other. That is, as exemplarily shown in FIG. 40, the first and fourth resistors R1 and R4 must be connected so as to be opposite each other, and the second and third resistances R2 and R3 must be connected so as to be opposite each other. Then, although the same input voltage VCC is applied, there is a potential difference VPOS-VNEG between output voltage VPOS between the first and second resistors R1 and R2 and output voltage VNEG between the third and fourth resistors R3 and R4. Therefore, changes in respective resistances may be measured and a magnitude of pressure may be measured therethrough.

Figure 43:
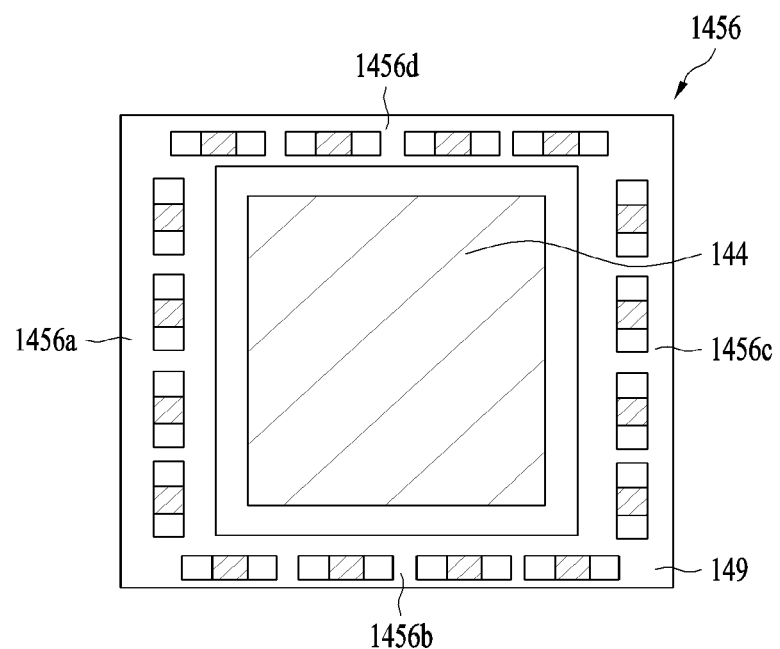
FIG. 43 is a front view of the force sensor providing an 8-channel function in accordance with one embodiment of the present invention, if the force sensor is a strain gauge type.
Figure 44:
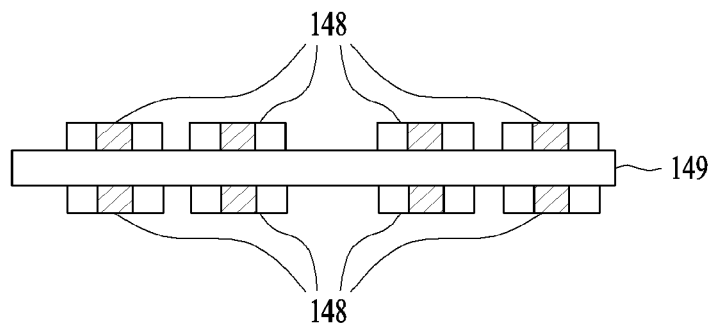
FIG. 44 is a conceptual view of the force sensor of FIG. 43, to which pressure is not applied.

FIG. 43 is a front view of the force sensor 1456 providing an 8-channel function in accordance with one embodiment of the present invention, if the force sensor 1456 is a strain gauge type, and FIG. 44 is a conceptual view of the force sensor 1456 of FIG. 43, to which pressure is not applied.

In the strain gauge-type force sensor 1456 in accordance with one embodiment of the present invention, one channel may include a plurality of strain gauges 148. For example, as exemplarily shown in FIGS. 43 and 44, in one channel, four strain gauges 148 may be attached to the upper surface of the PET film 149 and four strain gauges 148 may be attached to the lower surface of the PET film 149 and, thus, one channel may include a total of eight strain gauges 148. Here, as exemplarily shown in FIG. 44, the strain gauges 148 attached to the upper and lower surfaces of the PET film 149 may be attached to corresponding positions of the upper and lower surfaces of the PET film 149.

In the force sensor 1456 providing an 8-channel function, eight strain gauges 148 are attached to one channel and thus connected so as to form two Wheatstone bridges. Therefore, magnitudes of pressure applied to the respective channels may be exactly measured and, thus, an application direction of pressure may be more exactly measured. Hereinafter, parts of the construction and operation of this embodiment which are substantially the same as those of the embodiment shown in FIGS. 39 to 42 will thus be omitted because it is considered to be unnecessary.

The above description with reference to FIGS. 21 to 24 may be applied not only to the capacitive-type force sensor 1451 but also to the strain gauge-type force sensor 1456.

Specifically, the strain gauge-type force sensor 1456 providing a multi-channel function may measure not only a magnitude of applied pressure but also a direction of the applied pressure. For example, as exemplarily shown in FIG. 21, the user may press a position deviating leftward from the regular position of the fingerprint recognition sensor 144 with the finger 2. In this case, a magnitude of pressure applied to the first channel 1456a is greater than a magnitude of pressure applied to the second, third and fourth channels 1456b, 1456c and 1456d. Further, the fingerprint recognition sensor 144 may not smoothly recognize a fingerprint.

If the force sensor 1456 senses that the magnitude of pressure applied to the first channel 1456a is greater than the magnitude of pressure applied to the second, third and fourth channels 1456b, 1456c and 1456d and exceeds a predetermined error range and the fingerprint recognition sensor 144 may not smoothly recognize the fingerprint, the controller 180 of the mobile terminal 100 may determine that the user finger 2 deviates leftward from the regular position of the fingerprint recognition sensor 144. Further, the controller 180, as exemplarily shown in FIG. 22, may display the indicator 130 instructing the user to place the finger 2 to the right through the display unit 151.

For example, as exemplarily shown in FIG. 23, the user may press a position deviating downward from the regular position of the fingerprint recognition sensor 144 with the finger 2. In this case, a magnitude of pressure applied to the second channel 1456b is greater than a magnitude of pressure applied to the first, third and fourth channels 1456a, 1456c and 1456d. Further, the fingerprint recognition sensor 144 may not smoothly recognize a fingerprint.

If the force sensor 1456 senses that the magnitude of pressure applied to the second channel 1456b is greater than the magnitude of pressure applied to the first, third and fourth channels 1456a, 1456c and 1456d and exceeds the predetermined error range and the fingerprint recognition sensor 144 may not smoothly recognize the fingerprint, the controller 180 of the mobile terminal 100 may determine that the user finger 2 deviates downward from the regular position of the fingerprint recognition sensor 144. Further, the controller 180, as exemplarily shown in FIG. 24, may display the indicator 130 instructing the user to place the finger 2 to the upper side through the display unit 151.

As is apparent from the above description, a mobile terminal in accordance with one embodiment the present invention has at least one of effects, as follows.

A force sensor and a fingerprint recognition sensor are implemented as an under display type and, thus, an area of a display unit may be increased and the mobile terminal may recognize a user fingerprint when touch input is applied to the display unit.

Further, the force sensor and the fingerprint recognition sensor are disposed at positions close to each other without increase in the thickness of the mobile terminal and, thus, when a user applies touch input of a designated pressure or above by contacting a specific position with a finger, the mobile terminal may provide haptic feedback to the user simultaneously with recognition of a fingerprint.

Moreover, the force sensor may sense directivity and, thus, if a user contacts a position deviating from the regular position of the fingerprint recognition sensor with a finger, the mobile terminal may display an indicator instructing the user to move the finger to the regular position.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile terminal comprising:
a display unit configured to display an image and comprising an OLED pixel module emitting light and a light non-transmitting layer formed therebelow;
a fingerprint recognition sensor configured to recognize a fingerprint by receiving, when the light emitted from the OLED pixel module is reflected from a finger, the reflected light, the fingerprint recognition sensor including an upper surface facing the display unit, a lower surface opposite to the upper surface, and a side surface extending between the upper surface and the lower surface, the side surface being oriented not parallel to the display unit;
a sensor insertion space formed by perforating a part of the light non-transmitting layer, the fingerprint recognition sensor being inserted into the sensor insertion space; and
a force sensor disposed to face and surround the side surface of the fingerprint recognition sensor in a first plane, wherein the force sensor is configured to measure pressure applied to the force sensor in a second plane perpendicular to the first plane,
wherein the force sensor comprises:
a flexible printed circuit board having a shape transformable by the applied pressure; and
strain gauges attached to each of upper and lower surfaces of the flexible printed circuit board, and
wherein the force sensor is configured to measure the applied pressure through change in resistance of the strain gauges.

2. The mobile terminal according to claim 1, wherein the fingerprint recognition sensor is configured to optically communicate with the OLED pixel module to receive the reflected light via the OLED pixel.

3. The mobile terminal according to claim 1, wherein the sensor insertion space is configured to optically communicate with the OLED pixel module.

4. The mobile terminal according to claim 1, wherein the fingerprint recognition sensor contacts a light transmitting layer of the display unit, the light transmitting layer including the OLED pixel module.

5. The mobile terminal according to claim 1, wherein the force sensor and the fingerprint recognition sensor are placed in a common plane.

6. The mobile terminal according to claim 1, wherein the force sensor comprises a cushion member to absorb impact.

7. The mobile terminal according to claim 6, wherein the cushion member is disposed on one of upper and lower surfaces of the force sensor.

8. The mobile terminal according to claim 1, wherein the strain gauges are attached to corresponding positions of the upper and lower surfaces of the flexible printed circuit board.

9. The mobile terminal according to claim 1, further comprising a haptic module configured to generate haptic effect when the pressure is applied to the force sensor.

10. The mobile terminal according to claim 1, further comprising a haptic module configured to generate haptic effect when the fingerprint recognition sensor receives the fingerprint.

11. The mobile terminal according to claim 1, wherein the fingerprint recognition sensor is activated to receive the reflected light when the pressure is applied to the force sensor.

12. The mobile terminal according to claim 1, wherein a stiffener is attached to a lower surface of the fingerprint recognition sensor, which is exposed outside the display unit.

13. The mobile terminal according to claim 12, wherein the stiffener has a predetermined width and is formed along the edges of the fingerprint recognition sensor.

14. The mobile terminal according to claim 13, wherein the stiffener has a ring shape provided with a hole formed through a center thereof.

15. The mobile terminal according to claim 1, wherein the force sensor is disposed to surround an entire perimeter of the fingerprint recognition sensor, and is configured to measure pressure applied to respective edges of the fingerprint recognition sensor.

16. The mobile terminal according to claim 15, wherein the display unit is configured to, if a difference between the pressure applied to the respective edges of the force sensor exceeds a predetermined error range, display an indicator representing correction of an application direction of the pressure.

17. The mobile terminal according to claim 1, wherein the light non-transmitting layer comprises at least one of rubber, urethane, copper or graphite.

18. The mobile terminal according to claim 1, wherein the fingerprint recognition sensor is disposed below the OLED pixel module.

19. A mobile terminal comprising:
a display unit configured to display an image and comprising an OLED pixel module emitting light and a light non-transmitting layer formed therebelow;
a fingerprint recognition sensor configured to recognize a fingerprint by receiving, when the light emitted from the OLED pixel module is reflected from a finger, the reflected light, the fingerprint recognition sensor including an upper surface facing the display unit, a lower surface opposite to the upper surface, and a side surface extending between the upper surface and the lower surface, the side surface being oriented not parallel to the display unit;
a sensor insertion space formed by perforating a part of the light non-transmitting layer, the fingerprint recognition sensor being inserted into the sensor insertion space; and
a force sensor comprising a channel facing and surrounding the side surface of the fingerprint recognition sensor in a first plane, wherein the force sensor is configured to measure pressure applied to the force sensor in a second plane perpendicular to the first plane,
wherein the force sensor comprises:
a flexible printed circuit board having a shape transformable by the applied pressure; and
strain gauges attached to each of upper and lower surfaces of the flexible printed circuit board, and
wherein the force sensor is configured to measure the applied pressure through change in resistance of the strain gauges.

20. The mobile terminal according to claim 19, wherein the force sensor encloses the fingerprint recognition sensor by surrounding an entire perimeter of the fingerprint recognition sensor.

21. The mobile terminal according to claim 19, wherein the light non-transmitting layer comprises at least one of rubber, urethane, copper or graphite.

22. The mobile terminal according to claim 19, wherein the fingerprint recognition sensor is disposed below the OLED pixel module.

* * * * *